United States Patent
Weng

(10) Patent No.: US 6,440,361 B2
(45) Date of Patent: *Aug. 27, 2002

(54) CONTROLLER AND METHOD FOR ADMINISTERING AND PROVIDING ON-LINE HANDLING OF DEVIATIONS IN A HYDROSTATIC STERILIZATION PROCESS

(75) Inventor: Zhijun Weng, Fresno, CA (US)

(73) Assignee: FMC Technologies, Inc., Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/187,915

(22) Filed: Nov. 6, 1998

(51) Int. Cl.$^7$ .............................. G05B 1/00; G05B 23/00
(52) U.S. Cl. ............................... 422/3; 99/467; 99/468; 99/483; 422/105; 422/108; 422/109; 426/231; 426/232; 426/407; 426/521
(58) Field of Search ................................. 422/3, 26, 40, 422/105, 108, 109, 110; 426/231, 232, 392, 397, 407, 520, 521; 99/483, 467, 468, 359, 360

(56) References Cited

U.S. PATENT DOCUMENTS

| | | |
|---|---|---|
| 3,326,692 A | 6/1967 | Martino |
| 4,345,145 A | 8/1982 | Norwood |
| 4,437,159 A | 3/1984 | Waugh |
| 4,608,260 A | 8/1986 | Andre |

(List continued on next page.)

FOREIGN PATENT DOCUMENTS

| | | |
|---|---|---|
| EP | 0302306 | 2/1989 |
| EP | 0497546 | 8/1992 |

OTHER PUBLICATIONS

Fahloul et al., "Measurements and Predictive Modelling of Heat Fluxes in Continuous Baking Ovens," Journal of Food Engineering, 26:469–479 (1995).

(List continued on next page.)

Primary Examiner—Krisanne Thornton
(74) Attorney, Agent, or Firm—Dorsey & Whitney LLP; Larry Mendenhall

(57) ABSTRACT

A hydrostatic sterilization system, a controller for use in the hydrostatic sterilization system, and a method performed by the controller are disclosed. The system, controller, and method are used to administer a sterilization process performed on a line of carriers and to provide on-line handling of a deviation in a scheduled parameter during the process. The carriers carry containers of a shelf stable food product that is to be sterilized in the sterilization process. In addition to the controller, the hydrostatic sterilization system includes a hydrostatic sterilizer. The controller controls the hydrostatic sterilizer in performing the sterilization process according to scheduled parameters. When a deviation in a specific one of the scheduled parameters occurs, the controller identifies those of the carriers that will in response have a total lethality predicted to be delivered to them during the sterilization process that is less than a predefined target lethality.

36 Claims, 10 Drawing Sheets

US 6,440,361 B2
Page 2

U.S. PATENT DOCUMENTS

| | | |
|---|---|---|
| 4,668,856 A | 5/1987 | Axelson |
| 4,767,629 A | 8/1988 | Iglesias |
| 4,801,466 A | 1/1989 | Clyne et al. |
| 4,849,235 A | 7/1989 | Braymand |
| 4,962,299 A | 10/1990 | Duborper et al. |
| 5,062,066 A | 10/1991 | Scher et al. |
| 5,094,864 A | 3/1992 | Pinon et al. |
| 5,111,028 A | 5/1992 | Lee |
| 5,277,104 A | 1/1994 | Colaner |
| 5,378,482 A | 1/1995 | Kersten |
| 5,410,129 A | 4/1995 | Kersten et al. |
| 5,466,417 A | 11/1995 | Seki |
| 5,526,736 A | 6/1996 | Buriani |
| 5,529,931 A | 6/1996 | Narayan |
| 5,596,514 A | 1/1997 | Maher, Jr. et al. |
| 5,619,911 A | 4/1997 | Voegtlin |
| 5,652,006 A | 7/1997 | Assinder |
| 5,681,496 A | 10/1997 | Brownlow |
| 5,826,496 A | 10/1998 | Jara |
| 5,827,556 A | 10/1998 | Maher, Jr. |
| 5,888,566 A | 3/1999 | Alcaraz |
| 5,893,051 A | 4/1999 | Tomohiro |
| 5,981,916 A | 11/1999 | Griffiths et al. |
| 6,153,860 A | 11/2000 | Weng |

OTHER PUBLICATIONS

Huang et al., "Meatball Cooking–Modeling and Simulation," Journal of Food Engineering, 24:87–100 (1995).

Wang et al., "A Mathematical Model of Simultaneous Heat and Moisture Transfer during Drying of Potato," Journal of Food Engineering, 24:47–60 (1995).

Chen et al., "Modeling coupled heat and mass transfer for convection cooking of chicken patties," Journal of Food Engineering, 42:139–146 (1999).

Chang et al., "Modeling Heat Transfer During Oven Roasting of Unstuffed Turkeys," Journal of Food Science, 63(2):257–261 (1998).

Downing, D.L., "Canning of Marine Products", *A Complete Course in Canning and Related Processes, Book III*, p. 312–322, CTI Publications, Inc. 5 Baltimore, MD (1996).

Zhao, Y. et al., "Computer Simulation on Onboard Chilling and Freezing of Albacore Tuna", *Journal of Food Science*, vol. 63(5): 751–755, (1998).

Erdoğdu, F., et al., "Modeling of Heat Conduction in Elliptical Cross Section: I. Development and Testing of the Model", *Journal of Food Engineering*, vol. 38, pp. 223–239, (1998).

Weng, Z. et al., "Computer Control of a Hydrostatic with On–Line Correction of Process Deviations", *Institute of Food Technologists*, (Annual Meeting 1996), XP000892917 Chicago, US abstract.

Teixeira, A.A., et al., "On–line retort control in thermal sterilization of canned foods", *Food Control*, vol. 8, No. 1. 1997, pp 13–20.

Gill, T.A., et al., Computerized Control Strategies for a Steam Retort , *Journal of Food Engineering*, vol. 10, 1989, pps. 135–154.

Bichier, et al., "Thermal processing of canned foods under mechanical agitation", *Asme Heat Transfer Div Publ HTD.; American Society of Mechanical Engineers, Heat Transfer in Food Processing*, Abstract, 1993.

Weng, Z., et al., "Computer Control of a Hydrostatic Sterilizer Operations with On–Line Correction of Process Deviations", Presentation Slides, IFT '96, New Orleans, Jun. 23, 1996.

FMC FoodTech, "NumeriCAL On–Line™ for Batch Retorts . . . " (1997).

FMC FoodTech, "FMC's NumeriCAL™ v.2.09" (1995).

FMC FoodTech, "FMC's NumeriCAL™ Model 101 Software" (1995).

FMC FoodTech, "BatchCAL™ Thermal Processing Software" (1995).

Ball, C. O., et al., "Heating Curve–Simple Logarithmic Temperature Rise", in *Sterilization in food technology, Theory, Practice and Calculations*, Chap. 12:313–329.

Chang, S. Y., et al., "Heat Transfer and Simulated Sterilization of Particulate Solids in a Continuously Flowing System", *J. Food Sci.*, vol. 54(4):1017–1023 &1030 (1989).

Clausing, A. M. "Numerical Methods in Heat Transfer", lectures on advanced heat transfer, 157–181 (1989).

Datta, A. K., et al., "Computer–based Retort Control Logic for On–Line Correction of Process Deviations", *J. Food Sci.*, 51(2):480–483 & 507 (1986).

Fastag, J., et al., "Variable Control of a Batch Retort and Process Simulation for Optimization Studies", *J. of Food Process Engg.*, 19:1–14 (Nov. 1996).

Giannoni–Succar, E. B., et al., "Correction Factor of Deviant Thermal Processes Applied to Packaged Heat Conduction Food", repr. from *J. Food Sci.*, 47(2):642–646 (1982).

Hayakawa, K., "Estimating Heat Processes in Canned Foods", *Ashrae Journal*, 17(9):36–37 (Sept. 1975); Author corrects errors, *Food Technol.*, 29(2):70 (1975).

Lanoiselle, J.–L., et al., "Predicting Internal Temperature of Canned Foods During Thermal Processing using a Linear Recursive Model", *J. Food Sci.*, 60(4):833–840 (1995).

Larkin, J. W., et al., "Experimental Errors Associated with the Estimation of Thermal Diffusivity from Thermal Process Data", *J. Food Sci.*, 52(2):419–428 (1987).

McConnell, J.E.W., "Effect of a Drop in Retort Temperature Upon the Lethality of Processes for Convection Heating Products", *Food Tech.*, 76–78 (Feb. 1952).

Manson, J.E., "Evaluating Complex Deviations–Hydrostatic Sterilizers", *TechniCAL, Inc.*, Chap. 12: 12.1–12.4.

Manson, J.E., "Evaluation of Lethality and Nutrient Retentions of Conduction–Heating Foods in Rectangular Containers", *Food Technology*, 24(11):109–113 (1970).

Navankasattusas, S., et al., "Monitoring and Controlling Themal Processes by On–Line Measurement of Accomplished Lethality", *Food Technology*, 79–83 (Mar. 1978).

Denys, S., et al., "Evaluation of Process Deviations, Consisting of Drops in Rotational Speed, during Thermal Processing of Foods in Rotary Water Cascading Retorts", *J. Food Engg.*, 30:327–338 (1996).

Press, W. H., et al. "Parabolic Interpolation and Brent's Method in One Dimension", Chap. 10.2, Minimization or Maximization of Functions, 395–398.

Simpson, R., et al., "Computer Control of Batch Retort Process Operations", Food Processing Automation Conference (Proceedings), FPEI, ASAE, Lexington, KY (May 6–8, 1991).

Teixeira, A. A., et al. "Computer Control of Batch Retort Operations with On–Line Correction of Process Deviations", *Food Technology*, 85–90 (Apr. 1982).

Teixeira, A. A., et al., "Computer Optimization of Nutrient Retention in the Thermal Processing of Conduction–Heated Foods", *Food Techology*, vol. 23(845):137–142 (Jun. 1969).

Teixeira, A. A., "Innovative Heat Transfer Models: From Research Lab to On–Line Implementation", *Food Processing Automation II*, proceedings of the 1992 FPEI Conference, 177–184 (May 4–6, 1992).

Weng, Z., et al., "Computer Control of a Hydrostatic Sterilizer with On–Line Correction of Process Deviations", IFT 1986 presentation slides abstract (1986).

Weng. Z., et al., "Process Deviation Analysis of Conduction–Heating Canned Foods Processed in a Hydrostatic Sterilizer Using a Mathematical Model", *Journal Food Processing Automation IV*, vol. 41(6):368–379 (1995).

Weng, Z., et al., "The Use of a Time–Temperature–Integrator in Conjunction with Mathematical Modelling for Determining Liquid/Particle Heat Transfer Coefficients", *J. Food Engg.*, 16:197–214 (1992).

Young, K. E., et al., "Predicting Product Lethality in Hydrostatic Retorts", vol. 50:1467–1472 (1985).

Young, K. E., et al., "Product Temperature Prediction in Hydrostatic Retorts", *Transactions of the ASAE*, vol. 26(1):316–320 (1983).

Ball. C O., "Foundation of Food Process Calculation Methods", Sterilization in Food Technology, 124–125. No Date Available.

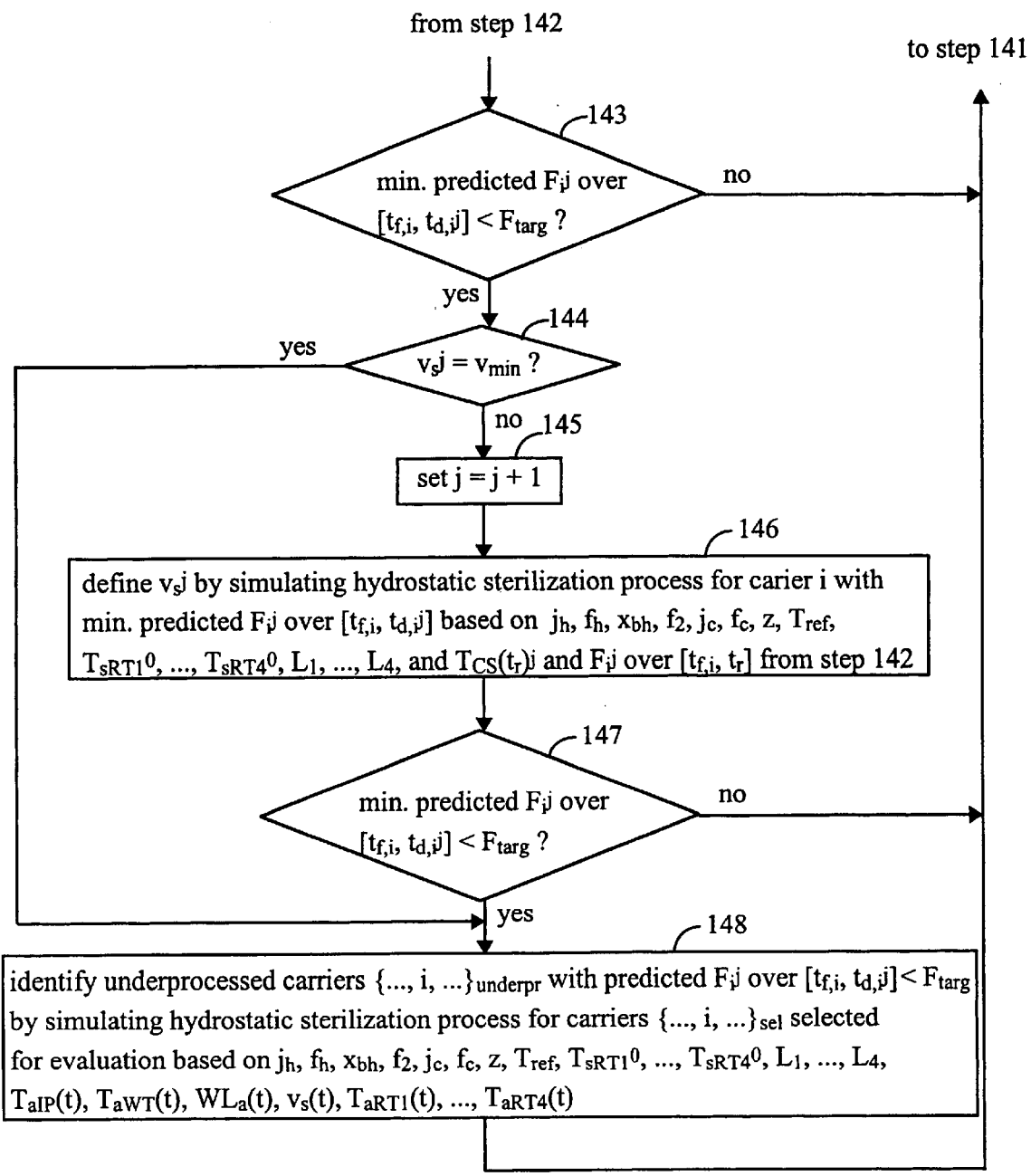
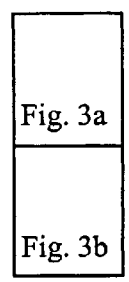
Fig. 3b
Fig. 3a
Fig. 3b
Fig. 3

CONTROLLER AND METHOD FOR ADMINISTERING AND PROVIDING ON-LINE HANDLING OF DEVIATIONS IN A HYDROSTATIC STERILIZATION PROCESS

TECHNICAL FIELD OF THE INVENTION

The present invention relates generally to a controller for administering a hydrostatic sterilization process being performed on line of carriers that each carry a set of containers. In particular, it pertains to such a controller that also provides on-line handling of a deviation in a scheduled parameter during the process by identifying any carriers with under processed containers as a result of the deviation.

BACKGROUND OF THE INVENTION

A hydrostatic sterilization system is a continuous source processing system. It is widely used in the canning industry to sterilize a shelf stable food product packaged in containers. It is used most often for sterilizing a food product that does not benefit from mechanical agitation of containers, as is performed in a rotary sterilization system.

A hydrostatic sterilization system comprises a hydrostatic sterilizer that has a conveyor (or chain) and a line of carriers $\{1, \ldots, i, \ldots, I\}_{line}$ conveyed by the conveyor. Each carrier i carries a set of containers and is conveyed through the hydrostatic sterilizer by the conveyor. The conveyor has a scheduled conveyor speed for conveying the carriers through the hydrostatic sterilizer. Moreover, the containers carried by each carrier are treated with scheduled retort temperatures in the hydrostatic sterilizer.

In order for the food product in the containers of each carrier i to be commercially sterilized, a total lethality $F_i$ over a total time interval $[t_{f,i}, t_{d,i}]$ that satisfies a predefined target total lethality $F_{targ}$ must be delivered during the hydrostatic sterilization process to the product cold spot of each container of the carrier. Here, $t_{f,i}$ and $t_{d,i}$ are the loading and unloading times when the carrier is loaded into and unloaded from the hydrostatic sterilizer. The target total lethality is set by the USDA (U.S. Department of Agriculture), the FDA (Food and Drug Administration), and/or a suitable food processing authority for destroying certain microorganisms. The conveyor speed and the retort temperatures are then scheduled so that the containers of each carrier will receive a time-temperature treatment according to a scheduled time-temperature profile that delivers a total lethality to the containers which satisfies the target total lethality.

As is well known, the lethality $F_i$ delivered to each container in a carrier i over a particular time interval $[t_m, t_k]$ is given by the lethality equation:

$$F_i = \int_{t_m}^{t_k} 10^{(T_{cs}(t)_i - T_{REF})/z} dt$$

where $t_m$ and $t_k$ are respectively the begin and end times of the time interval $[t_m, t_k]$, $T_{CS}(t)_i$ is the product cold spot time-temperature profile for the container, z is the thermal characteristic of a particular microorganism to be destroyed in the sterilization process, and $T_{REF}$ is a reference temperature for destroying the organism. Thus, the total lethality $F_i$ delivered to the container over the total time interval $[t_{f,i}, t_{d,i}]$ due to the scheduled retort temperatures is given by this lethality equation, where $t_m = t_{f,i}$ and $t_k = t_{d,i}$.

The total time interval $[t_{f,i}, t_{d,i}]$ and the product cold spot time-time-temperature profile $T_{CS}(t)_i$ must be such that the total lethality $F_i$ over $[t_{f,i}, t_{d,i}]$ satisfies the target total lethality $F_{targ}$. In order to ensure that this occurs, various mathematical simulation models have been developed for simulating the product cold spot time-temperature profile based on the scheduled retort temperatures. These models include those described in Ball, C. O. and Olson, F. C. W., *Sterilization in Food Technology; Theory, Practice and Calculations*, McGraw-Hill Book Company, Inc., 1957; Hayakawa, K., *Experimental Formulas for Accurate Estimation of Transient Temperature of Food and Their Application to thermal Process Evaluation*, Food Technology, vol. 24, no. 12, pp. 89 to 99, 1970; *Thermobacteriology in Food Processing*, Academic Press, New York, 1965; Teixeira, A. A., *Innovative Heat Transfer Models: From Research Lab to On-Line Implementation in Food Processing Automation II*, ASAE, p. 177–184, 1992; Lanoiselle, J. L., Candau, Y., and Debray E., *Predicting Internal Temperatures of Canned Foods During Thermal Processing Using a Linear Recursive Model*, J. Food Sci., Vol. 60, No. 4, 1995; Teixeira, A. A., Dixon, J. R., Zahradnik, J. W., and Zinsmeister, G. E., *Computer Optimization of Nutrient Retention in Thermal Processing of Conduction Heated Foods*, Food Technology, 23:137–142, 1969; Kan-Ichi Hayakawa, *Estimating Food Temperatures During Various Processing or Handling Treatments*, J. of Food Science, 36:378–385, 1971; Manson, J. E., Zahradnik, J. W., and Stumbo, C. R., *Evaluation of Lethality and Nutrient Retentions of Conduction-Heating Foods in Rectangular Containers*, Food Technology, 24(11):109–113, 1970; Noronha, J., Hendrickx, M., Van Loeg, A., and Tobback, P., *New Semi-empirical Approach to Handle Time-Variable Boundary Conditions During Sterilization of Non-Conductive Heating Foods*, J. Food Eng., 24:249–268, 1995; and the NumeriCAL model developed by Dr. John Manson of CALWEST Technologies, licensed to FMC Corporation, and used in FMC Corporation's LOG-TEC controller.

However, if any of the actual retort temperatures in the hydrostatic sterilizer drops below a corresponding scheduled retort temperature, a temperature deviation occurs. Traditionally, when such a deviation occurs, the controller stops the conveyor and prevents any of the carriers $\{1, \ldots, i, \ldots, I\}_{line}$ from being loaded into or unloaded from the hydrostatic sterilizer until the deviation is cleared. But, this approach causes numerous problems. For example, significant production down time will result. And, many carriers $\{\ldots, i, \ldots\}_{ovrpr}$ will have over processed containers since the total lethalities $\{\ldots, F_i \text{ over } [t_{f,i}, t_{d,i}], \ldots\}_{over}$ actually delivered to these containers will significantly exceed the target total lethality $F_{targ}$. All of these problems may result in severe economic loss to the operator of the hydrostatic sterilization system.

In order to prevent such loss, a number of approaches have been discussed and proposed for on-line control of sterilization processes. However, all of these approaches concern control of batch sterilization processes performed on a batch of containers $\{1, \ldots, i, \ldots, I\}_{batch}$. In a batch sterilization process, all of the containers generally receive the same time-temperature treatment whether or not a temperature deviation occurs. Thus, when a deviation does occur, a correction to the process can be made which simultaneously effects all of the containers so that a minimum total lethality $F_i$ over $[t_b, t_e]$ will be delivered to each container i, where $t_b$ and $t_e$ are the begin and end times of the batch sterilization process. An example of such an approach is described in concurrently filed and co-pending U.S. patent application Ser. No. 09/187,333, entitled Controller and Method for Administering and Providing On-Line Correction of a Batch Sterilization Process, filed on Nov. 6, 1998, with Weng, Z. as named inventor. This patent application is hereby explicitly incorporated by reference.

In contrast, each carrier i in a hydrostatic sterilization process will receive a unique time-temperature treatment. Thus, the total lethality $F_i$ over $[t_{f,i}, t_{d,i}]$ actually delivered to each carrier's containers is different. This makes it difficult to identify, while on-line and in real time, each carrier that will have a total lethality predicted to be delivered to its carriers that is below the target total lethality $F_{targ}$. As a result, the development of a controller that provides on-line handling of a temperature deviation in a hydrostatic sterilization process without stopping the conveyor has been inhibited.

However, in Weng, Z., Park, D. K., and Heyliger, T. L., *Process Deviation Analysis of Conduction Heating Canned Foods Processed in a Hydrostatic Sterilizer Using a Mathematical Model*, Food Processing Automation Conference IV, FPEI, ASAE, pp. 368–379, 1995, the distribution of the total lethalities $F_1$ over $[t_{f,1}, t_{d,1}], \ldots, F_i$ over $[t_{f,i}, t_{d,i}], \ldots, F_I$ over $[t_{f,I}, t_{d,I}]$ actually delivered for carriers $\{1, \ldots, i, \ldots, I\}_{line}$ was studied when a temperature deviation occurred. From this, an off-line approach was proposed to identify each carrier i with a total lethality $F_i$ over $[t_{f,i}, t_{d,i}]$ that was actually delivered which is less than the target total lethality $F_{targ}$. But, this approach is not performed in real time and limited to the conditions of a single temperature deviation and a well controlled water level in the sterilization chamber of the hydrostatic sterilizer.

SUMMARY OF THE INVENTION

In summary, the present invention comprises a hydrostatic sterilization system, a controller for use in the hydrostatic sterilization system, and a method performed by the controller. The system, controller, and method are used to administer a sterilization process performed on a line of carriers and provide on-line handling of a deviation from a scheduled parameter during the process. The carriers carry containers of a shelf stable food product that is to be sterilized in the sterilization process. In addition to the controller, the hydrostatic sterilization system includes a hydrostatic sterilizer.

The controller controls the hydrostatic sterilizer to perform the hydrostatic sterilization process according to scheduled parameters. When a deviation in a specific one of the scheduled parameters occurs, the controller identifies those of the carriers that will in response have a total lethality predicted to be delivered to them during the sterilization process that is less than a predefined target lethality. This specific scheduled parameter may be a scheduled retort temperature in a chamber of the hydrostatic sterilizer through which the line of carriers is conveyed. This specific scheduled parameter may also be a scheduled water level in a sterilization chamber of the hydrostatic sterilizer through which the line of carriers is conveyed. Or, it may be a scheduled initial product temperature for the containers in the carriers or a scheduled conveyor speed for conveying the carriers in line through the hydrostatic sterilizer.

DETAILED DESCRIPTION OF THE INVENTION

Figure 1:
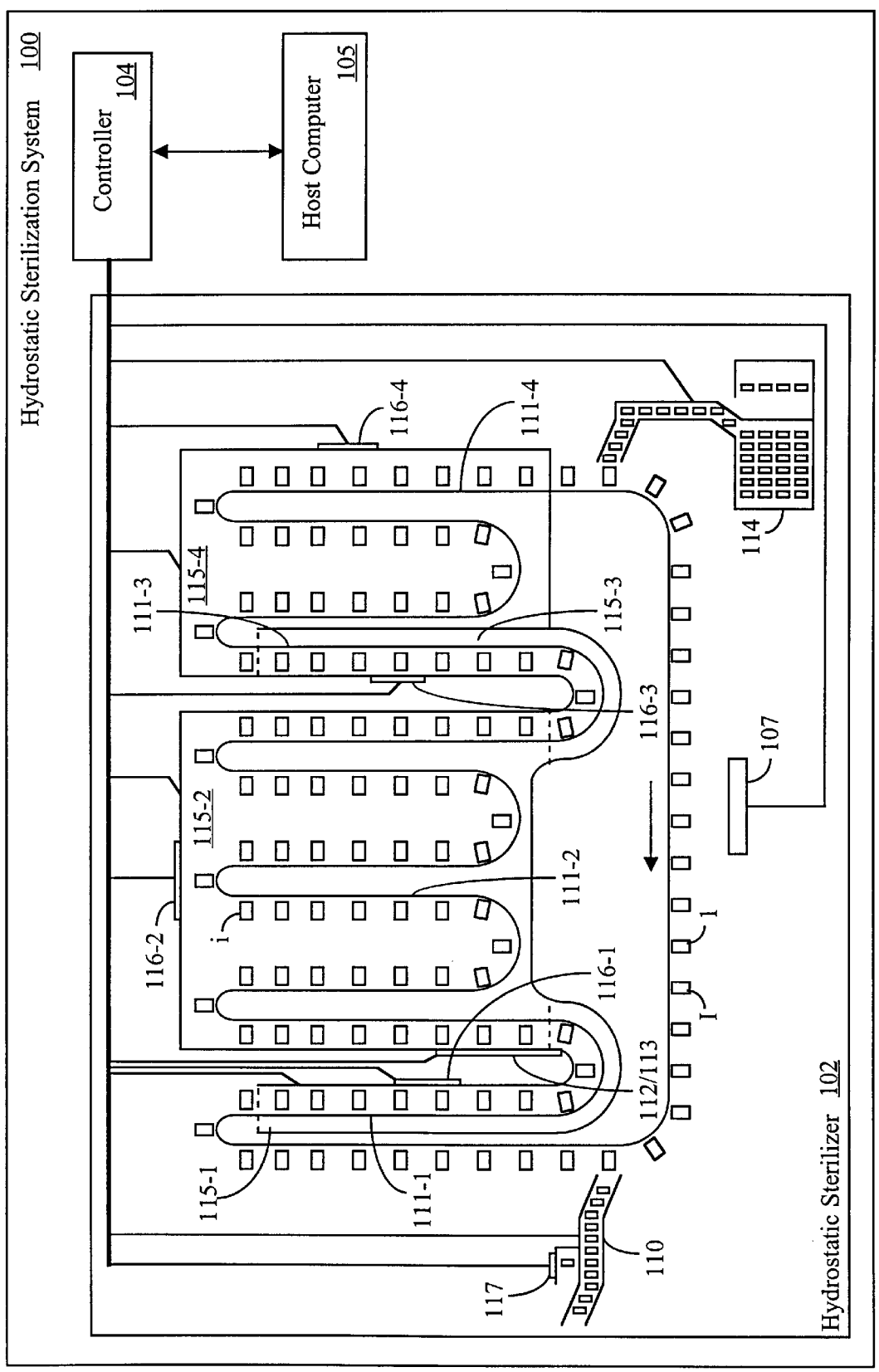
FIG. 1 is a block diagram of a hydrostatic sterilization system in accordance with the present invention.

Referring to FIG. 1, there is shown a hydrostatic sterilization system 100 for performing a hydrostatic sterilization process on containers of a food product. The system 100 comprises a hydrostatic sterilizer 102, a programmed controller 104, and a host computer 105. The hydrostatic sterilizer includes a continuous line of carriers $\{1, \ldots, i, \ldots, I\}_{line}$ and a conveyor 108 that conveys the carriers through the hydrostatic sterilizer. Each carrier i carries a set of the containers and is conveyed by the conveyor through the hydrostatic sterilizer so that process is performed on these containers. The controller and host computer are used to administer the process.

1. Exemplary Embodiment

In an exemplary embodiment, the hydrostatic sterilizer 102 includes a feed (or pre-cooking) chamber 115-1, a sterilization chamber (or steam dome) 115-2, a discharge (or pre-cooling) chamber 115-3, and a cooling chamber (or cooling tower) 115-4 through which the carriers $\{1, \ldots, i, \ldots, I\}_{line}$ are conveyed in line by the conveyor 108. The containers are loaded into the carriers by a loading device 110 and unloaded from the carriers by an unloading device 114.

The feed chamber 115-1 contains a column of water and serves as a hydrostatic valve to prevent the loss of pressure and temperature in the sterilization chamber 115-2. The conveyor 108 has a vertical leg (or pass) 111-1 in the feed chamber for conveying the carriers $\{1, \ldots, i, \ldots, I\}_{line}$ through the column of water. The column of water is heated so as to pre-cook the containers carried by the carriers to minimize the thermal shock they will experience when entering the sterilization chamber. In order to do so, the heated water is attempted to be kept at a corresponding scheduled pre-cooking retort temperature $T_{sRT1}^0$ for the feed chamber.

The carriers $\{1, \ldots, i, \ldots, I\}_{line}$ are then conveyed through the sterilization chamber 115-2 by the conveyor 108. The conveyor has multiple vertical legs (or passes) 111-2 in the sterilization chamber for conveying the carriers through steam in the sterilization chamber. The steam is used to cook the containers carried by the carriers and is attempted to be kept at a corresponding scheduled cooking retort temperature $T_{sRT2}^0$ for the sterilization chamber. Temperature deviations, however, may occur in the sterilization chamber. If the hydrostatic sterilizer is of the type where the water level in the sterilization chamber is not controlled and rises during a temperature deviation, a portion of each of the legs in the sterilization chamber may be immersed in the water during the temperature deviation. As a result, some of the carriers will also be cooked with water. But, if the hydrostatic sterilizer 102 is of the type in which the water level is kept substantially constant, then the carriers will only be cooked by steam.

Like the feed chamber 115-1, the discharge chamber 115-3 contains a column of water and serves as a hydrostatic valve to prevent the loss of pressure and temperature in the sterilization chamber 115-2. In this case, another vertical leg (or pass) 111-3 of the conveyor 108 in the discharge chamber conveys the carriers $\{1, \ldots, i, \ldots, I\}_{line}$ through this column of water after they have been conveyed through the sterilization chamber. And, this column of water is cooled so as to pre-cool the containers carried by the carriers. This is done to minimize the thermal shock these containers will experience when entering the cooling chamber. Here, the cooled water is kept at a corresponding scheduled pre-cooling retort temperature $T_{sRT3}^{\circ}$ for the feed chamber.

After the carriers $\{1, \ldots, i, \ldots, I\}_{line}$ exit the discharge chamber 115-3, they are conveyed through the cooling chamber 115-4 by the conveyor 108. As in the sterilization chamber, the conveyor has multiple vertical legs 111-4 in the cooling chamber for conveying the carriers through cooled water in the cooling chamber. The cooled water cools the containers carried by the carriers. It is kept at a corresponding scheduled cooling retort temperature $T_{sRT4}^{\circ}$ for the sterilization chamber.

At each sample real time $t_r$ (e.g., every 0.1 to 1 seconds) of the hydrostatic sterilization process, the sensors 116-1, ..., 4 of the hydrostatic sterilizer 102 respectively sense the actual retort temperatures $T_{aRT1}(t_r), \ldots, T_{aRT4}(t_r)$ in the corresponding chambers 115-1, ..., 4. The hydrostatic sterilizer also has sensors 112 and 113 that respectively sense the actual water level $WL_a(t_r)$ and actual water temperature $T_{aWT}(t_r)$ in the sterilization chamber 115-2 at each sample real time $t_r$. Similarly, the hydrostatic sterilizers sensor 107 senses the actual conveyor speed $v_a(t_r)$ of the conveyor 108 at each sample real time $t_r$. Finally, the loading device 110 periodically (e.g., every 20 to 30 minutes) removes a container being fed into the hydrostatic sterilizer and a sensor 117 of the hydrostatic sterilizer senses its actual initial product temperature $T_{aIP}(t_r)$ at that time $t_r$.

The controller 104 administers the hydrostatic sterilization process by controlling the hydrostatic sterilizer 102 and providing on-line handling of any temperature deviations during the process. This is done in response to the actual retort temperatures $T_{aRT1}(t_r), \ldots, T_{aRT4}(t_r)$ sensed by the sensors 116-1, ..., 4, the water level $WL_a(t_r)$ and actual water temperature $T_{aWT}(t_r)$ sensed by the sensors 112 and 113, the actual conveyor speed $v_a(t_r)$ sensed by the sensor 107, and the actual initial product temperature $T_{aIP}(t_r)$ sensed by the sensor 117.

The host computer 105 is used to provide input information, namely input parameters and software, used by the controller 104 in administering the hydrostatic sterilization process. The host computer is also used to receive, process, and display output information about the process which is generated by the controller.

1.a. Hardware and Software Configuration of Controller 104

Figure 2:
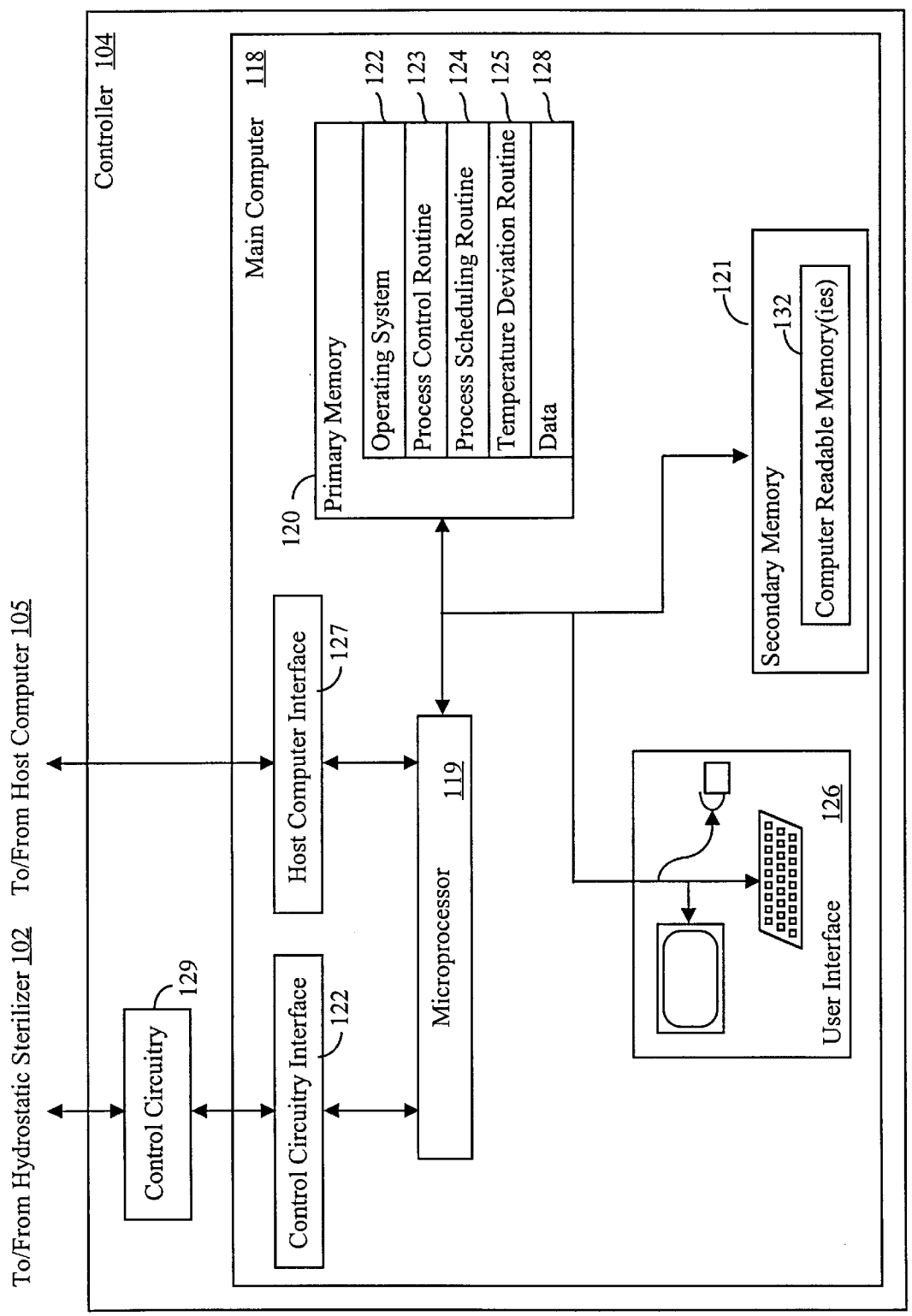
FIG. 2 is a block diagram of a controller of the hydrostatic sterilization system of FIG. 1.

Turning to FIG. 2, the controller 104 comprises a main control computer 118 that includes a microprocessor (i.e., CPU) 119, a primary memory 120, and a secondary memory 121. The microprocessor executes an operating system 122, a process control program 123, a process scheduling program 124, and a temperature deviation program 125 of the controller. The operating system and programs are loaded from the secondary memory into the primary memory during execution.

The operating system 122 and the programs 123 to 125 are executed by the microprocessor 119 in response to commands issued by the operator. These commands may be issued with a user interface 126 of the main control computer 118 and/or the host computer 105 via a host computer interface 127 of the controller 104. The operating system controls and coordinates the execution of the other programs. Data 128 generated by the operating system and programs during execution and data 128 inputted by the operator is stored in the primary memory. This data includes input information provided by the operator with the user interface and/or the host computer via the host computer interface. It also includes output information provided to the user interface or the host computer via the host computer interface that is to be displayed to the operator.

The controller 104 also comprises control circuitry 129. The control circuitry includes circuits, microprocessors, memories, and software to administer the hydrostatic sterilization process by generating control signals that control the sequential operation of the hydrostatic sterilizer 102. As alluded to earlier, the software may be downloaded from the host computer 105 and provided to the control circuitry by the process control program 123. The control signals are generated in response to commands generated by this program and issued to the control circuitry from the microprocessor 119 via a control circuitry interface 130 of the main control computer 118.

Furthermore, at each sample real time $t_r$ of the hydrostatic sterilization process, the control circuitry 129 receives sensor signals from the sensors 107, 112, 113, 117, and 116-1, ..., 4 that represent the actual conveyor speed $v_a(t_r)$, the actual water level $WL_a(t_r)$, the actual water temperature $T_{aWT}(t_r)$, and the actual initial product and retort temperatures $T_{aIP}(t_r)$ and $T_{aRT1}(t_r), \ldots, T_{aRT4}(t_r)$. The control circuitry generates the control signals for controlling the hydrostatic sterilizer 102 in response to these temperatures. These temperatures are also provided to the microprocessor 119 via the control circuitry interface 130 and recorded by the process control program 123 as data 128 in the primary memory 120. In this way, the process control program compiles and records in the primary memory 120 an actual conveyor time-speed profile $v_a(t)$, a water level-time profile $WL_a(t)$, an actual water time-temperature profile $T_{aWT}(t)$, an actual initial product time-temperature profile $T_{aIP}(t)$, and actual retort time-temperature profiles $T_{aRT1}(t), \ldots, T_{aRT4}(t)$ for the corresponding chambers 115-1, ..., 4. These profiles are used in the manner described later for providing on-line handling of temperature deviations during the hydrostatic sterilization process.

The sensors 116-1, ..., 4 are preferably located in the slowest heating regions of the chambers 115-1, ..., 4 to provide conservative estimates of the actual retort temperatures $T_{aRT1}(t_r), \ldots, T_{aRT4}(t_r)$. However, if this is not possible, the process control program 123 may adjust the temperatures provided by the sensors to estimate the actual retort temperatures at the slowest heating regions. This adjustment would be done according to temperature distribution data 128 in the primary memory 120 generated from heating and cooling temperature distribution tests conducted on the chambers.

As mentioned earlier, the operating system 122 and the other programs 123 to 125 are normally stored in the secondary memory 121 and then loaded into the primary memory 120 during execution. The secondary memory comprises one (or multiple) computer readable memory(ies) 132 that is(are) readable by the main control computer 118 of the controller 104. The computer readable memory(ies) is(are) therefore used to direct the controller in controlling the hydrostatic sterilization process. The computer readable memory(ies) may comprise a PROM (programmable read only memory) that stores the operating system and/or the other programs. Alternatively or additionally, the computer readable memory(ies) may comprise a magnetic or CD ROM storage disc that stores the operating system and/or the other programs. The computer readable memory(ies) in this case is(are) readable by the main control computer with a magnetic or CD ROM storage disk drive of the secondary memory. Moreover, the operating system and/or the other programs could also be downloaded to the computer readable memory(ies) or the primary memory from the host computer 105 via the host computer interface 127.

The controller 104 controls the hydrostatic sterilization process according to the flow and timing diagrams of FIGS. 3 to 9. In doing so, a finite difference simulation model is used by the process scheduling program 124 to simulate a scheduled product cold spot time-temperature profile $T_{CS}(t)_i^0$ that applies to all of the carriers $\{1, \ldots, i, \ldots, I\}_{line}$. Similarly, the temperature deviation program 125 uses the model to simulate corresponding product cold spot time-temperature profiles $\{\ldots, T_{CS}(t)_i^j, \ldots\}$ for corresponding selected carriers $\{\ldots, i, \ldots\}_{sel}$ at each sample real time $t_r$ during a temperature deviation. This model may be the earlier mentioned NumeriCAL model and used for both conduction heated food products and convection heated food products. Or, it may be one of the models described in the Teixeira et al., 1969 and Manson et al., 1970 references and used for conduction heated food products. As will be evident from the foregoing discussion, the novelty of the invention described herein is not in which model is used, but in the manner in which it is used according to the flow and timing diagrams in FIGS. 3 to 9.

1.b. Overall Process Flow

Figure 3A:
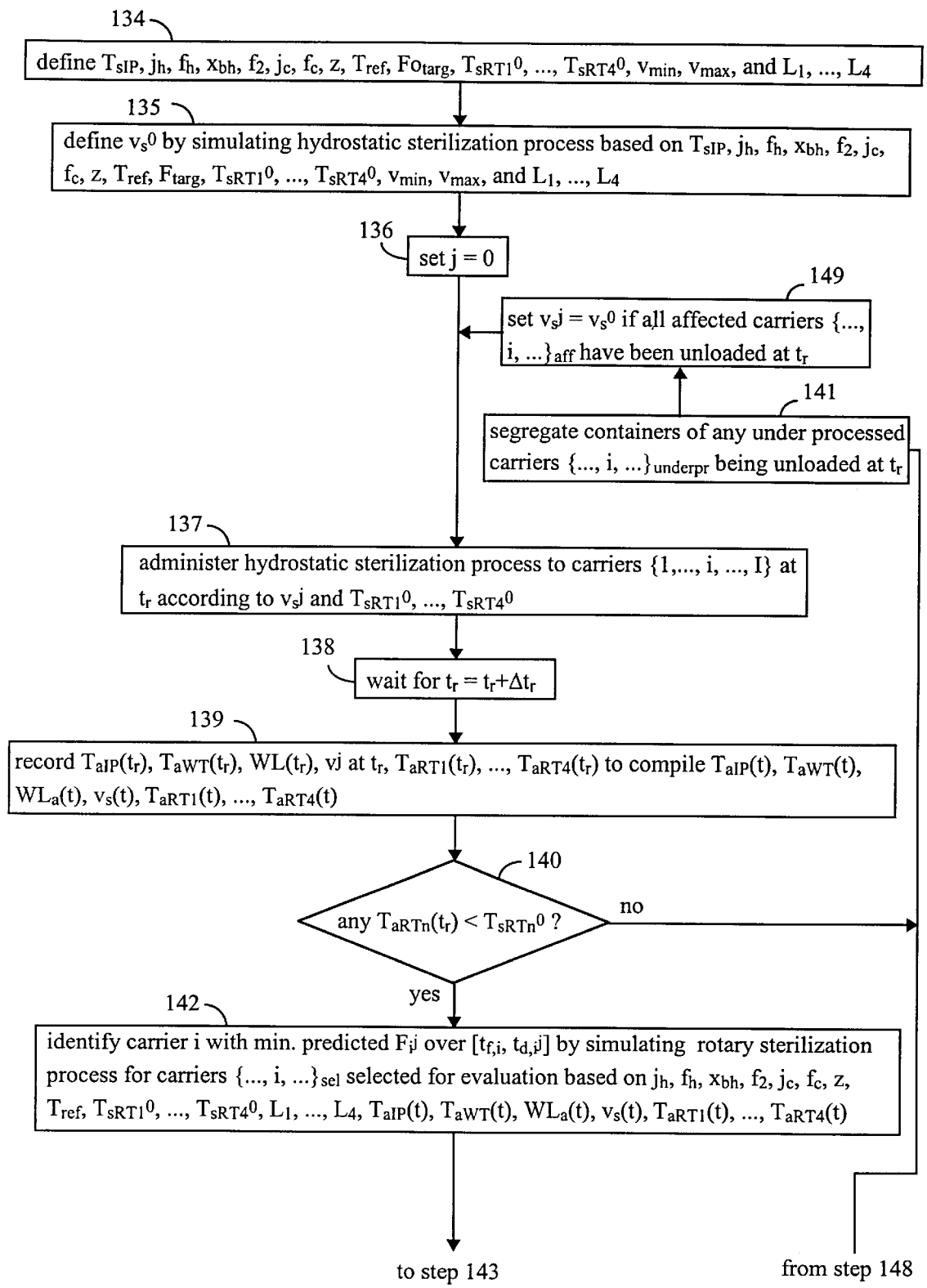
FIG. 3 is an overall process flow diagram for the controller of FIG. 2 in controlling a hydrostatic sterilization process performed by the hydrostatic sterilization system of FIG. 1.

In the first step 134 for controlling the hydrostatic sterilization process according to the overall process flow of FIG. 3, the input parameters for the hydrostatic sterilization process are defined and provided to the controller 104. The input parameters include a predefined sampling time period $\Delta t_r$ for each real time increment $[t_r - \Delta t, t_r]$ from the previous sample real time $t_r - \Delta t_r$ to the current sample real time $t_r$ during the process. The input parameters also include a initially scheduled product temperature $T_{sIP}$ for the food product in the carriers being processed. The input parameters further include the traditional heating and cooling factors $j_h$, $f_h$, $x_{bh}$, $f_2$, $j_c$, and $f_c$ to be used in the simulation model. The heating factors $j_h$, $f_h$, $x_{bh}$, and $f_2$ are respectively the heating time lag factor, the heating curve slope factor, the broken heating time factor, and the broken heating curve slope factor that are pre-defined for the food product. Similarly, the cooling factors $j_c$ and $f_c$ are respectively the cooling time lag factor and the cooling curve slope factor that are also pre-defined for the food product. The input parameters additionally include the earlier discussed thermal characteristic z for destroying a particular microorganism in the food product and the associated reference temperature $T_{REF}$. Also included in the input parameters is the earlier discussed target total lethality $F_{targ}$ and earlier discussed scheduled retort temperatures $T_{sRT1}^0, \ldots, T_{sRT4}^0$. Finally, the input parameters include a scheduled water level $WL_s$ in the sterilization chamber 115-2, the minimum and maximum conveyor speeds $v_{min}$ and $v_{max}$, and length and location information $L_1, \ldots, L_4$ for the legs 114-1, ..., 4 in the corresponding chambers 115-1, ..., 4.

In order to perform step 134, the operator issues commands with the user interface 126 and/or the host computer 105 to invoke the process control program 123. Then, the operator enters the input parameters $T_{sIP}$, $j_h$, $f_h$, $x_{bh}$, $f_2$, $j_c$, $f_c$, $F_{targ}$, $T_{sRT1}^0, \ldots, T_{sRT4}^0$, $WL_s$, $v_{min}$, $v_{max}$, and $L_1, \ldots, L_4$ with the user interface 126 and/or the host computer 105. The process control program 123 loads the entered input parameters into the primary memory 120 for use by the programs 123 to 125. The execution of these programs is controlled and coordinated by the process control program in the manner discussed next.

The process control program 123 first invokes the process scheduling program 124. In step 135, the process scheduling program simulates the entire hydrostatic sterilization process to be administered to a carrier i to define an initially scheduled conveyor speed $v_s^0$ for the conveyor 108. This also results in an initially scheduled time-temperature profile $T_{sRT}(t)_i^0$ for the time-temperature treatment that is to be given to the containers in each carrier i. This profile includes pre-cooking, cooking, pre-cooling, and cooling portions at the corresponding scheduled pre-cooking, cooking, pre-cooling, and cooling retort temperatures $T_{sRT1}^0, \ldots, T_{sRT4}^0$ over corresponding initially scheduled time durations $\Delta t_1^0, \ldots, \Delta t_4^0$. The precise manner in which step 135 is performed is discussed in greater detail in section 1.c., but will be briefly discussed next.

The initially scheduled conveyor speed $v_s^0$ and the initially scheduled total time-temperature profile $T_{sRT}(t)_i^0$ are defined by using the simulation model mentioned earlier. Specifically, the process scheduling program 124 uses the simulation model to iteratively and incrementally simulate an initially predicted product cold spot time-temperature profile $T_{CS}(t)_i^0$ that is predicted to occur at the product cold spots of the containers of each carrier i during the hydrostatic sterilization process. This simulation is based on the input parameters $T_{sIP}$, $j_h$, $f_h$, $x_{bh}$, $f_2$, $j_c$, $f_c$, and $T_{sRT1}^0, \ldots, T_{sRT4}^0$.

The process scheduling program 124 also iteratively and incrementally computes an initially predicted lethality $F_i^0$ that is predicted to be delivered to the product cold spots of the containers of each carrier i during the hydrostatic sterilization process. In doing so, the program iteratively and incrementally computes a predicted total lethality $F_i^0$ that satisfies the target total lethality $F_{targ}$ and is predicted to be delivered to these product cold spots over a simulated total time interval $[0, \Delta t_1^0 + \ldots + \Delta t_4^0]$. This computation is made based on the product cold spot time-temperature profile $T_{CS}(t)_i^0$ over this total time duration and the input parameters z and $T_{REF}$. Furthermore, the lethality equation described earlier is used to make this computation, where $t_m=0$, $t_k=\Delta t_1^0 + \ldots + \Delta t_4^0$, $T_{CS}(t)=T_{CS}(t)_i^0$, and $F_i=F_i^0$.

The initially predicted total lethality $F_i^0$ over $[0, \Delta t_1^0 + \ldots + \Delta t_4^0]$ is iteratively and incrementally computed until the initially scheduled conveyor speed $v_s^0$ is determined for which this lethality satisfies the target total lethality $F_{targ}$. Moreover, the initially scheduled time durations $\Delta t_1^0, \ldots, \Delta t_4^0$ are determined from the conveyor speed $v_s^0$ and the length and location information $L_1, \ldots, L_4$ for the legs 111-1, ..., 4 of the conveyor 108. Thus, definition of the conveyor speed $v_s^0$ also includes definition of the pre-cooking, cooking, pre-cooling, and cooling portions of the initially scheduled total time-temperature profile $T_{sRT}(t)^0$ on which the portions of the profile $T_{CS}(t)^0$ over the time durations $\Delta t_1^0, \ldots, \Delta t_4^0$ are based.

The process control program 123 controls the administration of the hydrostatic sterilization process in steps 136 to 149. In doing so, it first sets a counter j to zero in step 136. This counter is used to count each time that the currently scheduled conveyor speed $v_s^j$ is adjusted during the hydrostatic sterilization process.

Then, at the current sample real time $t_r$, the process control program 123 causes the control circuitry 129 in step 137 to administer the hydrostatic sterilization process at the currently scheduled conveyor speed $v_s^j$ and at the scheduled retort temperatures $T_{sRT1}^0, \ldots, T_{sRT4}^0$ in the corresponding chambers 115-1, ..., 4. In doing so, the control circuitry appropriately controls the hydrostatic sterilizer 102 and monitors the actual retort temperatures $T_{aRT1}(t_r), \ldots, T_{aRT4}(t_r)$ in the corresponding chambers 115-1, ..., 4 at the time $t_r$ to verify that they are at least equal to the corresponding scheduled retort temperatures $T_{sRT1}^0, \ldots, T_{sRT4}^0$. In this embodiment of the controller 104, the scheduled retort temperatures will remain the same throughout the hydrostatic sterilization process regardless if temperature deviations occur in the chambers. Thus, if such a temperature deviation does occur in a particular chamber 115-n, then the control circuitry administers corrections at the time $t_r$ so that the actual retort temperature $T_{aRTn}(t_r)$ in the chamber 115-n will eventually be brought up to at least the corresponding temperature $T_{sRTn}^0$.

Then the process control program 123 waits for the next sample real time $t_r=t_r+\Delta t_r$ in step 138. In step 139, this program records the actual retort temperatures $T_{aRT1}(t_r), \ldots, T_{aRT4}(t_r)$ in the chambers 115-1, ..., 4 at each sample real time $t_r$. By doing so, the program 123 compiles the corresponding actual retort time-temperature profiles $T_{aRT1}(t), \ldots, T_{aRT4}(t)$. Similarly, the program records the actual initial product temperature $T_{aIP}(t_r)$ periodically sensed by the sensor 117 to compile the actual initial product time-temperature profile $T_{aIP}(t)$. Furthermore, the program also records the currently scheduled conveyor speed $v_s^j$ at each time $t_r$. This is done to compile a scheduled conveyor time-speed profile $v_s(t)$ for the hydrostatic sterilization process to provide a record of the changes in the scheduled conveyor speed $v_s^j$.

Then, in step 140, the process control program 123 determines whether any temperature deviations are occurring at the time $t_r$ in the chambers 115-1, ..., 4. In doing so, the program 123 monitors each temperature $T_{aRTn}(t_r)$ to determine if it is less than the corresponding scheduled cooking or cooling retort temperature $T_{sRTn}^0$.

If no deviation is occurring, then the process control program 123 proceeds to step 141. Any of the under processed carriers $\{ \ldots, i, \ldots \}_{underpr}$ that were identified in step 148 for segregation and are being unloaded by the unloading device 114 at the current sample real time $t_r$ will then have their under processed containers segregated in step 141. The process control program causes the control circuitry 129 to control the unloading device 114 in performing this segregation in the manner discussed later. In step 149, the process control program sets the currently scheduled conveyor speed $v_s^j$ to the initially scheduled conveyor speed $v_s^0$ if all of the carriers $\{ \ldots, i, \ldots \}_{aff}$ affected by a temperature deviation have been unloaded. Both steps 141 and 149 are discussed later in more detail. The process control program then administers the hydrostatic sterilization process in step 137 and waits for the next sample real time $t_r=t_r+\Delta t_r$ in step 138 to repeat the steps 139 to 149.

However, if the process control program 123 does determine in step 140 that a temperature deviation is occurring in a chamber 115-n at the current sample real time $t_r$, then the process control program invokes the temperature deviation program 125. In the example shown in FIG. 4, the temperature deviation occurs in the sterilization chamber 115-2. In step 142, the program 125 identifies the carrier i that at the time $t_r$ has the minimum total lethality $F_i^j$ predicted to be delivered to the product cold spots of the containers it carries over the currently scheduled total time interval $[t_{f,i}, t_{d,i}^j]$ for the carrier. This minimum lethality carrier i is identified from among the carriers $\{ \ldots, i, \ldots \}_{aff}$ that are currently affected by the temperature deviation. These affected carriers are those of the carriers $\{1, \ldots, i, \ldots, I\}_{line}$ that are at the time $t_r$ currently in the chamber 115-n in which the temperature deviation is occurring. This is determined using the conveyor time-speed profile $v_s(t)$ compiled in step 139 and the length and location information $L_1, \ldots, L_4$ for the legs 111-1, ..., 4.

In one approach for identifying the minimum lethality carrier i from among the affected carriers $\{ \ldots, i, \ldots \}_{aff}$, the temperature deviation program 125 may use an optimization search technique, such as the Brendt method disclosed in Press, W. H., Teukolsky, S. A., Vettering, W. T., and Flannery, B. P., *Numerical Recipes in Fortran: The Art of Scientific Computing*, Cambridge University Press, 1992. In this case, the program iteratively computes predicted total lethalities $\{ \ldots, F_i^j \text{ over } [t_{f,i}, t_{d,i}^j], \ldots \}_{sel}$ for carriers $\{ \ldots, i, \ldots \}_{sel}$ selected to be evaluated. Based on these lethalities, the program iteratively bisects the list of affected carriers to select the selected carriers from among the affected carriers until the minimum lethality carrier i is identified.

The approach just described is useful for handling a temperature deviation in the sterilization chamber 115-2 if the hydrostatic sterilizer 102 is of the type in which the water level $WL_a(t_r)$ in the sterilization chamber is kept substantially constant. However, if the hydrostatic sterilizer is of the type where the water level is not controlled and rises during a temperature deviation, a portion of each of the legs 111-2 will be immersed in the water during a temperature deviation. As a result, some of the affecetd carriers $\{ \ldots, i, \ldots \}_{aff}$ will be immersed in this water as well. Moreover, if the temperature deviation is long enough, these carriers may be immersed several times because of the multiple legs in the sterilization chamber. Each of these carriers will therefore be treated with the portion(s) of the actual water time-temperature profile $T_{aWT}(t)$ over the time interval(s) that it is immersed in the water and with the portions of the actual retort temperatures $T_{aRT2}(t)$ over the time intervals that it is not immersed. Here, k identifies each time interval for which the carrier is immersed.

Figure 5:
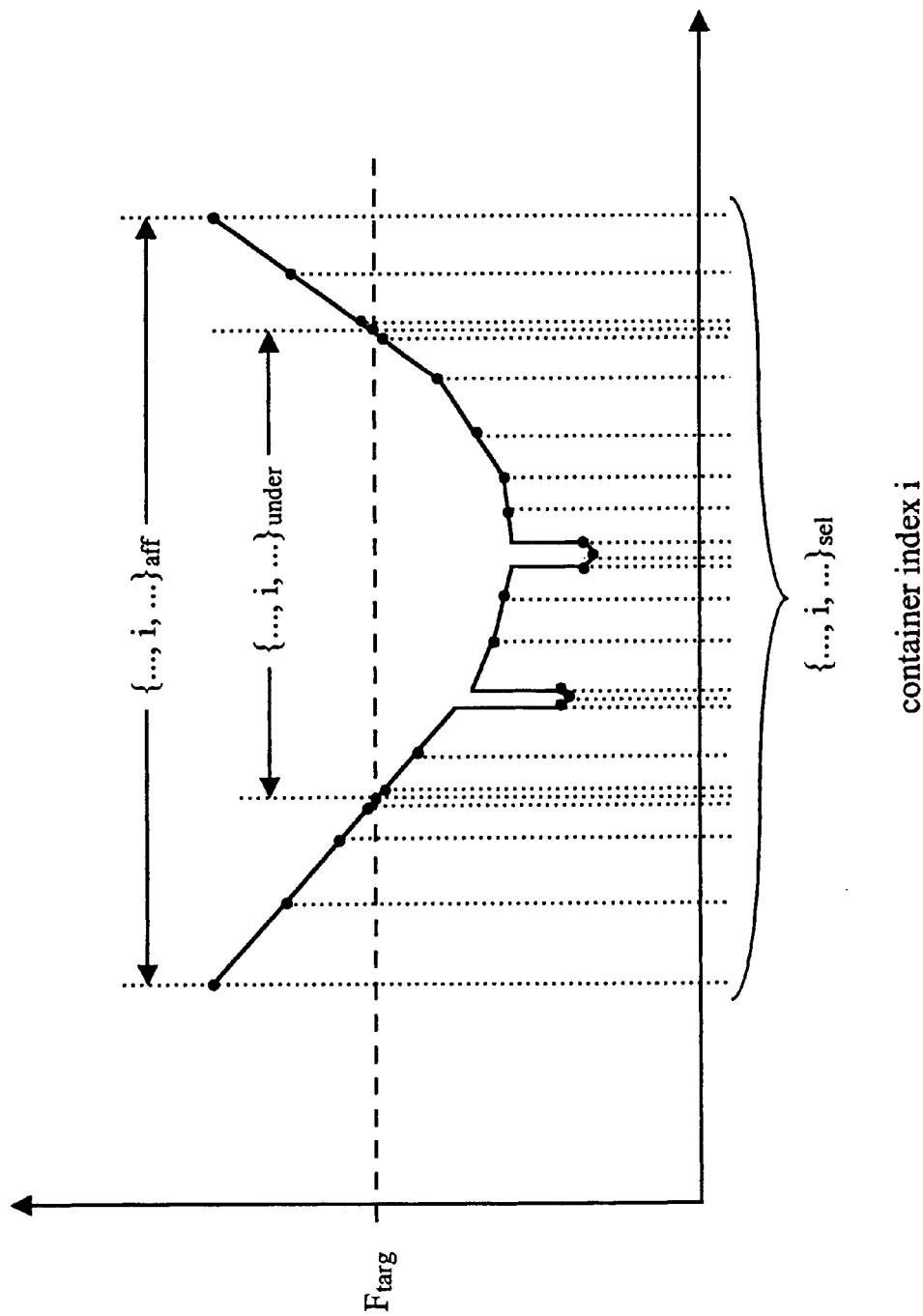
FIG. 5 is a lethality distribution diagram showing the distribution of lethalities for carriers affected by the temperature deviation shown in FIG. 4.

As a result, there will be pockets of affected containers $\{ \ldots, i, \ldots \}_{aff}$ that have very low predicted total lethalities $\{ \ldots, F_i^j \text{ over } [t_{f,i}, t_{d,i}^j], \ldots \}_{aff}$, as shown in FIG. 5. Thus, in a variation of the first approach just described, the temperature deviation program 125 may initially use predefined intervals to initially select carriers $\{ \ldots, i, \ldots \}_{int}$ at the intervals for evaluation. Then, around those of the initially selected carriers that have the lowest predicted total lethalities $\{ \ldots, F_i^j \text{ over } [t_{f,i}, t_{d,i}^j], \ldots \}_{int}$, the optimization search technique just described is used. This ensures that each of the pockets of carriers with very low predicted total lethalities is evaluated.

In still another approach for identifying the minimum lethality carrier i, the temperature deviation program 125 may select all of the affected carriers $\{ \ldots, i, \ldots \}_{aff}$ as the selected carriers $\{ \ldots, i, \ldots \}_{sel}$ for evaluation. In doing so, the program computes at each sample real time $t_r$ the predicted total lethality $F_i^j$ over $[t_{f,i}, t_{d,i}^j]$ for each carrier i. From the computed lethalities $\{ \ldots, F_i^j \text{ over } [t_{f,i}, t_{d,i}^j], \ldots \}_{sel}$ for the selected carriers, the minimum lethality carrier i is identified.

In each of the approaches just described, the predicted total lethality $F_i^j$ over $[t_{f,i}, t_{d,i}^j]$ for each selected carrier i is computed in the same way. Specifically, the temperature deviation program 125 first computes an actual current lethality $F_i^j$ delivered to the product cold spots of the carrier's contianers over the actual time interval $[t_{f,i}, t_r]$ that the carrier has been in the hydrostatic sterilizer 102. This is done by simulating the portion of the hydrostatic sterilization process that was actually administered over this time interval. In doing so, the simulation model mentioned earlier is used to iteratively and incrementally simulate the actual portion of the product cold spot time-temperature profile $T_{CS}(t)_i^j$ over this time interval for the carrier i. This is done based on the input parameters $j_h$, $f_h$, $x_{bh}$, $f_2$, $j_c$, and $f_c$, the actual initial product temperature $T_{aIP}(t_{f,i})$ for the containers of the carrier i, the portions of the actual retort time-temperature profiles $T_{aRT1}(t), \ldots, T_{aRTn}(t)$ respectively over the actual time intervals $[t_{f,i}, t_{1,i}^j], \ldots, (t_{n-1,i}^j, t_r]$ that the carrier was in the chambers 115-1, ..., n. Here, n identifies the chamber 115-n in which the temperature deviation is occurring. And, if the temperature deviation occurs in the sterilization chamber 115-2, as shown in the example of FIG. 4, and the hydrostatic sterilizer 102 is of the type where the water level in the sterilization chamber is not controlled, then this simulation is also done based on each portion of the actual water time-temperature profile $T_{awT}(t)$ over any corresponding portion of the time interval $(t_{1,i}^j, t_r]$ that the carrier was immersed in the water.

The actual initial product temperature $T_{aIP}(t_{f,i})$ for the carrier i is obtained from the actual initial product time-temperature profile $T_{aIP}(t)$ compiled in step 139. The actual time intervals $[t_{f,i}, t_{1,i}^j], \ldots, (t_{n-1,i}^j, t_r]$ for the selected carrier i are determined by the temperature deviation program 125 from the conveyor time-speed profile $v_s(t)$ and the length and location information $L_1, \ldots, L_n$ for the legs 111-1, ..., n. If the temperature deviation occurs in the sterilization chamber 115-2 and the water level in it is not controlled, then any portion(s) of the time interval $(t_{1,i}^j, t_r]$ that the carrier was immersed in the water are determined from the conveyor time-speed profile and the length and location information for the legs and the water level-time profile $WL_a(t)$.

Figure 4:
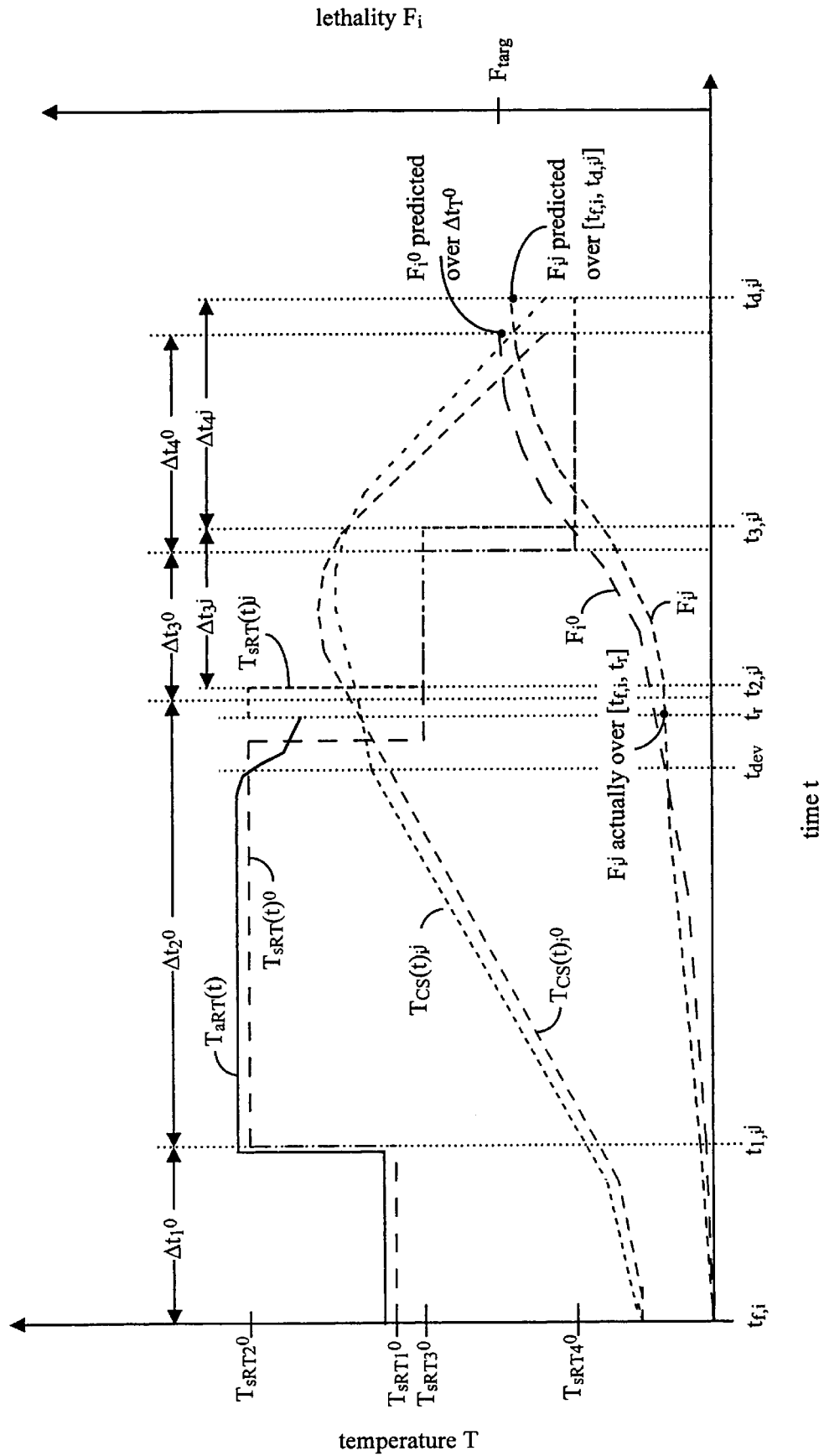
FIG. 4 is a timing diagram for handling a temperature deviation according to the overall process flow diagram of FIG. 3.

In the example of FIG. 4, the temperature deviation occurs in the sterilization chamber 115-2. Thus, the portion of the product cold spot temperature profile $T_{CS}(t)_i^j$ that actually occurred over the actual time interval $[t_{f,i}, t_r]$ is based in this case on the portion of the actual retort time-temperature profile $T_{aRT1}(t)$ over the actual time interval $[t_{f,i}, t_{1,i}^j]$, the portion(s) of the retort time-temperature profile $T_{aRT2}(t)$ over the actual time interval $(t_{1,i}^j, t_r]$ that the carrier was not immersed in the water in the sterilization chamber, and any portion(s) of the actual water time-temperature profile $T_{awT}(t)$ over any corresponding portion(s) of the time interval $(t_{1,i}^j, t_r]$ that the carrier was immersed in the water. The time interval $[t_{f,i}, t_{1,i}^j]$ has the initially scheduled time duration $\Delta t_1^0$ since the temperature deviation began at the deviation begin time $t_e$ while the carrier i was in the sterilization chamber. If, however, this carrier was in the chamber 115-1 when the deviation began, then the time interval $[t_{f,i}, t_{1,i}^j]$ would have a different time duration $\Delta t_1^j$ because the conveyor speed $v_s^j$ would have been changed while the carrier was in that chamber.

From the actual portion of the product cold spot time-temperature profile $T_{CS}(t)_i^j$ over $[t_{f,i}, t_r]$ and the input parameters z and $T_{REF}$, the temperature deviation program 125 iteratively and incrementally computes the actual current lethality $F_i^j$ that has been delivered to the cold spot of the selected carrier i over the actual time interval $[t_{f,i}, t_r]$. This is done using the lethality equation described earlier, where $t_m = t_{f,i}$, $t_k = t_r$, $T_{CS}(t) = T_{CS}(t,i^j)$, and $F_i = F_i^j$. The precise manner in which the actual current lethality is computed in step 142 is discussed in greater detail in section 1.d.

Then, the temperature deviation program 125 simulates the remaining portion of the hydrostatic sterilization process that is predicted to be administered to the containers of the selected carrier i over the scheduled remaining time interval $(t_r, t_{d,i}^j]$ assuming that the temperature deviation ends after the time $t_r$. In performing this simulation, the simulation model mentioned earlier is used to iteratively simulate the predicted remaining portion of the product cold spot time-temperature profile $T_{CS}(t)_i^j$ based on the input parameters $j_h$, $f_h$, $x_{bh}$, $f_2$, $j_c$, and $f_c$, the actual product cold spot temperature $T_{CS}(t_r)_i^j$ at the time $t_r$, and the scheduled retort temperatures $T_{sRTn}^0, \ldots, T_{sRT4}^0$ over the currently scheduled remaining time intervals $(t_r, t_{n,i}^j], \ldots, (t_{3,i}^j, t_{d,i}^j]$.

The actual product cold spot temperature $T_{CS}(t_r)_i^j$ for the product cold spots of the containers of the selected carrier i is obtained from the actual portion of the product cold spot time-temperature profile $T_{CS}(t)_i^j$ over $[t_{f,i}, t_r]$ that was just described. Moreover, the currently scheduled time intervals $(t_r, t_{n,i}^j], \ldots, (t_{3,i}^j, t_{d,i}^j]$ for the carrier i are determined by the temperature deviation program 125 from the conveyor time-speed profile $v_s(t)$, and the chamber length and location information $L_1, \ldots, L_4$.

In the example of FIG. 4, the temperature deviation occurs in the sterilization chamber 115-2. Thus, the predicted remaining portion of the product cold spot temperature profile $T_{CS}(t)_i^j$ is based on the scheduled retort temperatures $T_{sRT2}^0$, $T_{sRT3}^0$, and $T_{sRT4}^0$ respectively over the currently scheduled remaining time intervals $(t_r, t_{2,i}^j]$, $(t_{2,i}^j, t_{3,i}^j]$, and $(t_{3,i}^j, t_{d,i}^j]$. In this example, the time intervals and $(t_{1,i}^j, t_{2,i}^j]$, $(t_{2,i}^j, t_{3,i}^j]$, and $(t_{3,i}^j, t_{d,i}^j]$ respectively have re-scheduled time durations $\Delta t_2^j$, $\Delta t_3^j$, and $\Delta t_4^j$ that are different than the initially scheduled time durations $\Delta t_2^0$, $\Delta t_3^0$, and $\Delta t_4^0$ since the currently scheduled conveyor speed $v_s^j$ at the current sample real time $t_r$ has been re-scheduled from the initially scheduled conveyor speed $v_s^0$.

The temperature deviation program 125 iteratively and incrementally computes the total lethality $F_i^j$ predicted to be delivered to the product cold spots of the containers of the selected carrier i over the scheduled total time interval $[t_{f,i}, t_{d,i}^j]$. This is done based on the predicted remaining portion of the product cold spot time-temperature profile $T_{CS}(t)_i^j$ over $(t_r, t_{d,i}^j]$, the actual current lethality $F_i^j$ over $[t_{f,i}, t_r]$ that was just described, and the input parameters z and $T_{REF}$. This is also done using the lethality equation described earlier, where $t_m = t_r$, $t_k = t_{d,i}^j$, $T_{CS}(t) = T_{CS}(t)_i^j$, and $F_i = F_i^j$. The predicted total lethality is the sum of the actual current lethality and a predicted remaining lethality $F_i^j$ that is predicted to be delivered to the product cold spots over the time interval $(t_r, t_{d,i}^j]$. The precise manner in which the predicted total lethality is computed in step 142 is discussed in greater detail in section 1.e.

Then, in step 143, the temperature deviation program 125 determines at the current sample real time $t_r$ if the carrier i with the minimum predicted total lethality $F_i^j$ over $[t_{f,i}, t_{d,i}^j]$ is less than the target total lethality $F_{targ}$. If it is not, then this means that all of the affected carriers $\{\ldots, i, \ldots\}_{aff}$ also have predicted total lethalities $\{\ldots, F_i^j$ over $[t_{f,i}, t_{d,i}^j], \ldots\}_{aff}$ that are at least equal to the target total lethality. In this case, the process control program 123 proceeds to step 141 and causes any of the previously identified under processed carriers $\{\ldots, i, \ldots\}_{underpr}$ that are being unloaded at the time $t_r$ to be segregated. Then, in the manner discussed earlier, the process control program 123 administers the hydrostatic sterilization process in step 137 and waits for the next sample real time $t_r=t_r+\Delta t_r$ in step 138 to repeat the steps 139 to 148.

In this embodiment, if it is determined in step 143 that the minimum total lethality $F_i^j$ over $[t_{f,i}, t_{d,i}^j]$ is less than the target total lethality $F_{targ}$, then the temperature deviation program 125 determines in step 144 if the currently scheduled conveyor speed $v_s^j$ is set to the minimum conveyor speed $v_{min}$. If it is not, then the program increments the counter j in step 145 and defines a re-scheduled (or adjusted) conveyor speed $v_s^j$ in step 146.

In step 146, the re-scheduled conveyor speed $v_s^j$ is defined in a similar manner to the way in which the initially scheduled conveyor speed $v_s^0$ is defined in step 135. But, in this case the actual product cold spot temperature $T_{CS}(t_r)_i^j$ at the time $t_r$ and the actual current lethality $F_i^j$ over $[t_{f,i}, t_r]$ for the minimum lethality carrier i are used in simulating the remaining portion of the hydrostatic sterilization process in order to compute a predicted total lethality $F_i^j$ over $[t_{f,i}, t_{d,i}^j]$. This is done in a similar manner to that described earlier for computing the predicted total lethality for a carrier in step 142. Similar to step 135, this is done iteratively and incrementally until the conveyor speed is determined for which the predicted total lethality satisfies the total target lethality $F_{targ}$ or the conveyor speed equals the minimum conveyor speed $v_{min}$. The precise manner in which step 146 is performed is discussed in greater detail in section 1.f., but will be briefly discussed next.

The definition of the re-scheduled conveyor speed therefore also results in the definition of a re-scheduled remaining time-temperature profile $T_{sRT}(t)_i^j$. In the example of FIG. 4, the profile includes a remaining cooking portion at the scheduled retort temperature $T_{sRT3}^0$ over a corresponding re-scheduled time duration $\Delta t_3^j$. Similarly, the profile also includes pre-cooling and cooling portions at the scheduled retort temperatures $T_{sRT4}^0$ and $T_{sRT4}^0$ over corresponding re-scheduled time durations $\Delta t_4^j$ and $\Delta t_4^j$.

Ideally, it is desired that the minimum predicted total lethality $F_i^j$ over $[t_{f,i}, t_{d,i}^j]$ for the minimum lethality carrier i will satisfy the target total lethality $F_{targ}$. But, as just mentioned, the re-scheduled conveyor speed $v_s^j$ may be limited to the minimum conveyor speed $v_{min}$. In this case, the minimum predicted total lethality will not satisfy the target total lethality $F_{targ}$. If the temperature deviation program 125 determines this to be the case in step 147, then this means that under processed carriers $\{\ldots, i, \ldots\}_{underpr}$ from among the affected carriers $\{\ldots, i, \ldots\}_{aff}$ will have predicted total lethalities $\{\ldots, F_i^j$ over $[t_{f,i}, t_{d,i}^j], \ldots\}_{underpr}$ that are less than the target total lethality. The minimum lethality carrier i is of course one of the under processed carriers. The under processed carriers are to be segregated and are identified at the current real sample time $t_r$ in step 148 by the program.

FIG. 5 shows the distribution of the affected carriers $\{\ldots, i, \ldots\}_{aff}$ and the under processed carriers $\{\ldots, i, \ldots\}_{underpr}$ to be segregated at the time $t_r$. In identifying the under processed carriers in step 148, the program 125 uses a similar approach as that used in step 142 to identify the minimum lethality carrier i. But, in this case, the additional criteria of the target total lethality $F_{targ}$ is used to expand the search.

Once the under processed carriers $\{\ldots, i, \ldots\}_{underpr}$ have been identified at the current real sample time $t_r$, the process control program 123 then proceeds to step 141. As discussed earlier, this program causes the control circuitry 129 to control the unloading device 114 in segregating the containers of any of the under processed carriers that are being unloaded at the current sample real time $t_r$. In order to properly segregate these containers, the process control program tracks the under processed carriers to determine when they will be unloaded. This is done using the conveyor time-speed profile $v_s(t)$ and the length and location information $L_1, \ldots, L_4$ for the legs 111-1, ..., 4.

The steps 137 to 149 are repeated until the temperature deviation is cleared. In this way, at each sample real time $t_r$ during the deviation, the list of under processed carriers $\{\ldots, i, \ldots\}_{underpr}$ at the time $t_r$ is combined with the list from the previous sample real time $t_r$. As a result, the list of under processed carriers is dynamically updated and maintained. Since the containets of these under processed carriers are segregated when unloaded in step 141, this will ensure that the containers in only those of the carriers $\{1, \ldots, i, \ldots I\}_{line}$ that are adequately processed are released for distribution.

The list of affected carriers $\{\ldots, i, \ldots\}_{aff}$ is also dynamically updated and maintained in the same manner as the list of under processed containers $\{\ldots, i, \ldots\}_{underpr}$. When the temperature deviation is cleared, this list will remain the same and the process control program 123 tracks the carriers in this list until they have all been unloaded. This tracking is done in the same manner in which the under processed carriers are tracked. The process control program 123 will then set the currently scheduled conveyor speed $v_s^j$ back to the initially scheduled conveyor speed $v_s^0$ in step 149.

Furthermore, the controller 104 has the unique feature of being able to handle multiple temperature deviations. For example, if another temperature deviation does occur, then the steps 137 to 149 are repeated during this deviation. Therefore, even if a selected carrier i is exposed to multiple temperature deviations, the predicted total lethality $F_i^j$ over $[t_{f,i}, t_{d,i}^j]$ that will be delivered to it can be accurately determined based on those of the actual retort temperature profiles $T_{aRT1}(t), \ldots, T_{aRT4}(t)$ that it has been treated with over the hydrostatic sterilization process. Moreover, this results in the list of under processed carriers $\{\ldots, i, \ldots\}_{underpr}$ being further updated and expanded.

1.c. Detailed Process Flow for Step 135 of FIG. 3

Figure 6:
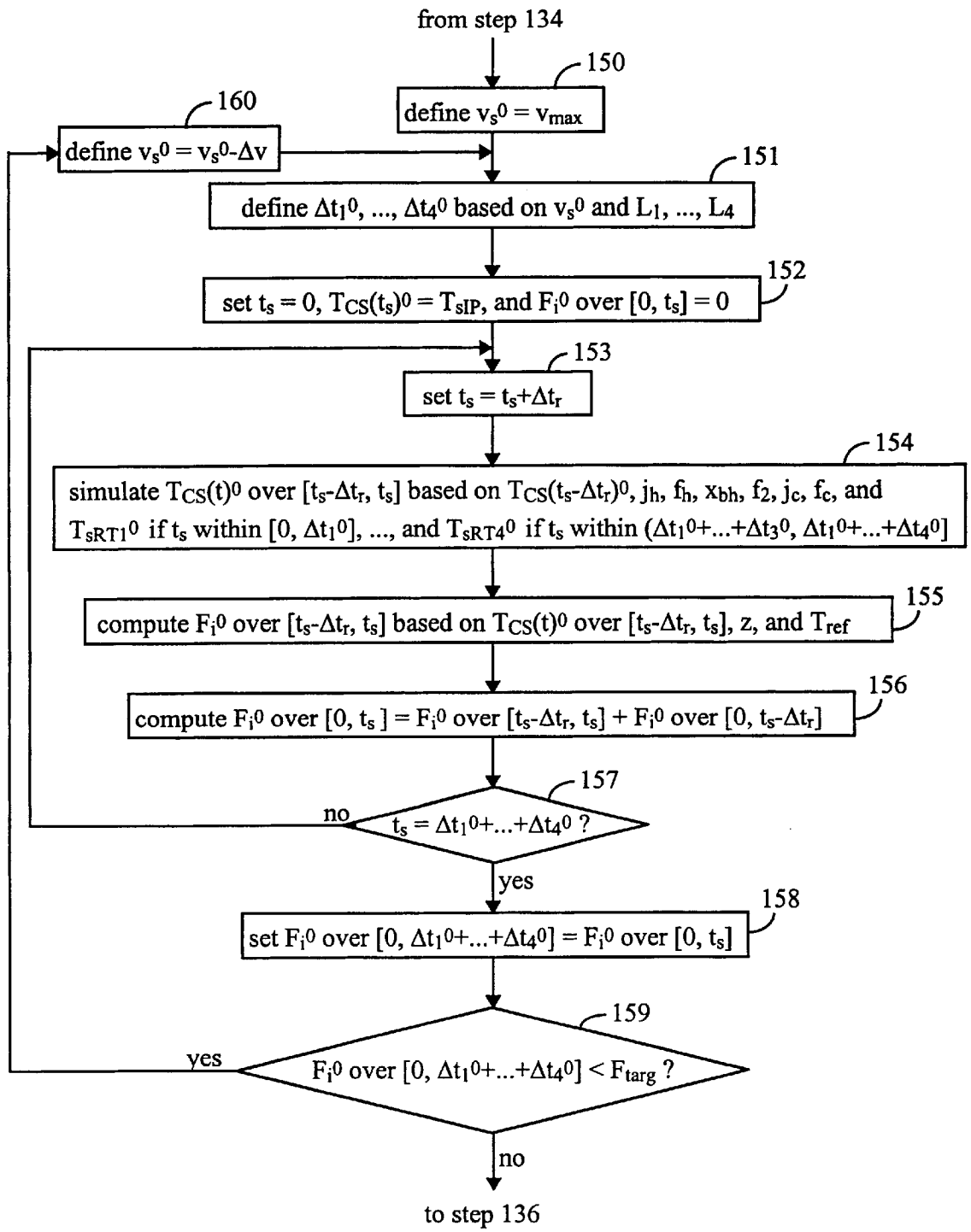
FIGS. 6 to 9 are detailed process flow diagrams for various steps of the overall process flow diagram of FIG. 3.

FIG. 6 shows the detailed process flow that the process scheduling program 124 uses in step 135 of FIG. 3 to define the initially scheduled conveyor speed $v_s^0$. In doing so, this program iteratively performs a simulation of the hydrostatic sterilization process that is predicted to be administered to each carrier i in sub-steps 150 to 160 of step 135.

In step 150, the process scheduling program 124 first defines the initially scheduled conveyor speed $v_s^0$ as the maximum conveyor speed $v_{max}$. Then, in step 151, the program defines the time durations $\Delta t_1^0, \ldots, \Delta t_4^0$ for how long each carrier i is scheduled to be in the respective chambers 115-1, ..., 4. This is done based on the initially scheduled conveyor speed and the length and location information $L_1, \ldots, L_4$ for the chambers.

In step 152, the current sample simulation time $t_s$ is initially set to zero by the process scheduling program 124. This is the begin time of the simulated hydrostatic sterilization process for the carrier i. The program also initially sets the predicted product cold spot temperature $T_{CS}(t_s)_i^0$ at this time to the scheduled initial product temperature $T_{sIP}$. Similarly, the lethality $F_i^0$ predicted to be delivered to these product cold spots over the current simulation time interval $[0, t_s]$ initially set by the program to zero.

Steps 153 to 157 are then performed by the process scheduling program 124 in each iteration of the simulation. In step 153 of each iteration, the program increments the current sample simulation time $t_s$ by the amount of the sampling period $\Delta t_r$. This results in a new current sample simulation time $t_s$.

Then, in step 154 of each iteration, the process scheduling program 124 simulates the portion of the product cold spot time-temperature profile $T_{CS}(t)_i^0$ predicted to occur at the product cold spots of the containers in the carrier i over the current simulation time increment $[t_s-\Delta t_r, t_s]$. This is done using the simulation model discussed earlier and is based on the predicted product cold spot temperature $T_{CS}(t_s-\Delta t_r)_i^0$ for these product cold spots at the previous sample simulation time $t_s-\Delta t_r$ and the heating and cooling factors $j_h$, $f_h$, $x_{bh}$, $f_2$, $j_c$, and $f_c$. In the first iteration, this product cold spot temperature will be the scheduled initial product temperature $T_{sIP}$ from step 152. However, in each subsequent iteration, the product cold spot temperature is obtained from the portion of the product cold spot temperature profile predicted over the previous simulation time increment $[t_s-2\Delta t_r, t_s-\Delta t_r]$ that was simulated in step 154 of the previous iteration. Moreover, the simulation is also based on the respective scheduled retort temperatures $T_{sRT1}^0, \ldots, T_{sRT4}^0$ when the current sample simulation time $t_s$ is within the corresponding simulation time intervals $[0, \Delta t_1^0], \ldots, [\Delta t_1^0 + \ldots + \Delta t_3^0, \Delta t_1^0 + \ldots + \Delta t_4^0]$. These time intervals indicate how long the carrier i is scheduled to be in the respective chambers 115-1, ..., 4.

The lethality $F_i^0$ that is predicted to be delivered to the product cold spots of the containers in the carrier i over the current simulation time increment $[t_s-\Delta t_r, t_s$9 is then computed by the process scheduling program 124 in step 155 of each iteration. This is done based on the portion of the product cold spot time-temperature profile $T_{CS}(t)_i^0$ predicted over this time increment and the input parameters z and $T_{REF}$. This is also done in accordance with the lethality equation described earlier, where $t_m=t_s-\Delta t_r$, $t_k=t_s$, $T_{CS}(t) = T_{CS}(t)_i^0$, and $F_i=F_i^0$.

In step 156 of each iteration, the process scheduling program 124 computes the lethality $F_1^0$ predicted to be delivered to the product cold spots of the containers in the carrier i over the current simulation time interval $[0, t_s]$. This is done by adding the predicted lethality $F_i^0$ over the current simulation time increment $[t_s-\Delta t_r, t_s]$ in step 154 to the lethality $F_i^0$ predicted to be delivered to the product cold spots over the previous simulation time interval $[0, t_s-\Delta t_r]$. In the first iteration, the predicted lethality over the previous simulation time interval is zero from step 152. In each subsequent iteration, this lethality is computed in step 156 of the previous iteration.

Then, in step 157 of each iteration, the process scheduling program 124 determines whether the current simulation time ts has reached the end time $[\Delta t_1^0 + \ldots + \Delta t_4^0]$ of the simulated hydrostatic sterilization process for the carrier i. If it is not, then the program returns to step 153 for the next iteration. In this way, steps 153 to 157 are repeated in each subsequent iteration until it is determined that the end time for the simulated hydrostatic sterilization process has been reached. When this finally occurs, the program sets in step 158 the lethality $F_i^j$ over the current simulation time interval $[0, t_s]$ to the total lethality $F_i^j$ predicted to be delivered to the product cold spots of the carriers containers over the total simulation time interval $[0, \Delta_1^0 + \ldots + \Delta t_4^0]$.

When this finally occurs, the process scheduling program 124 determines in step 159 whether the predicted total lethality $F_i^0$ over $[0, \Delta t_1^0 + \ldots + \Delta t_4^0]$ is at least equal to the target total lethality $F_{targ}$. If it is not, then the program decrements in step 160 the initially scheduled conveyor speed $v_s^0$ by a predefined conveyor speed offset $\Delta v$. This results in the re-definition of this conveyor speed. Steps 151 to 160 are then repeated until step 159 is satisfied. The conveyor speed for which step 159 is satisfied is then used in steps 136 to 148 of FIG. 3 in the manner discussed earlier.

1.d. Detailed Process Flow for Computing Lethality $F_i^j$ over $[t_{f,i}, t_r]$ in Steps 142 and 148 of FIG. 3

Figure 7:
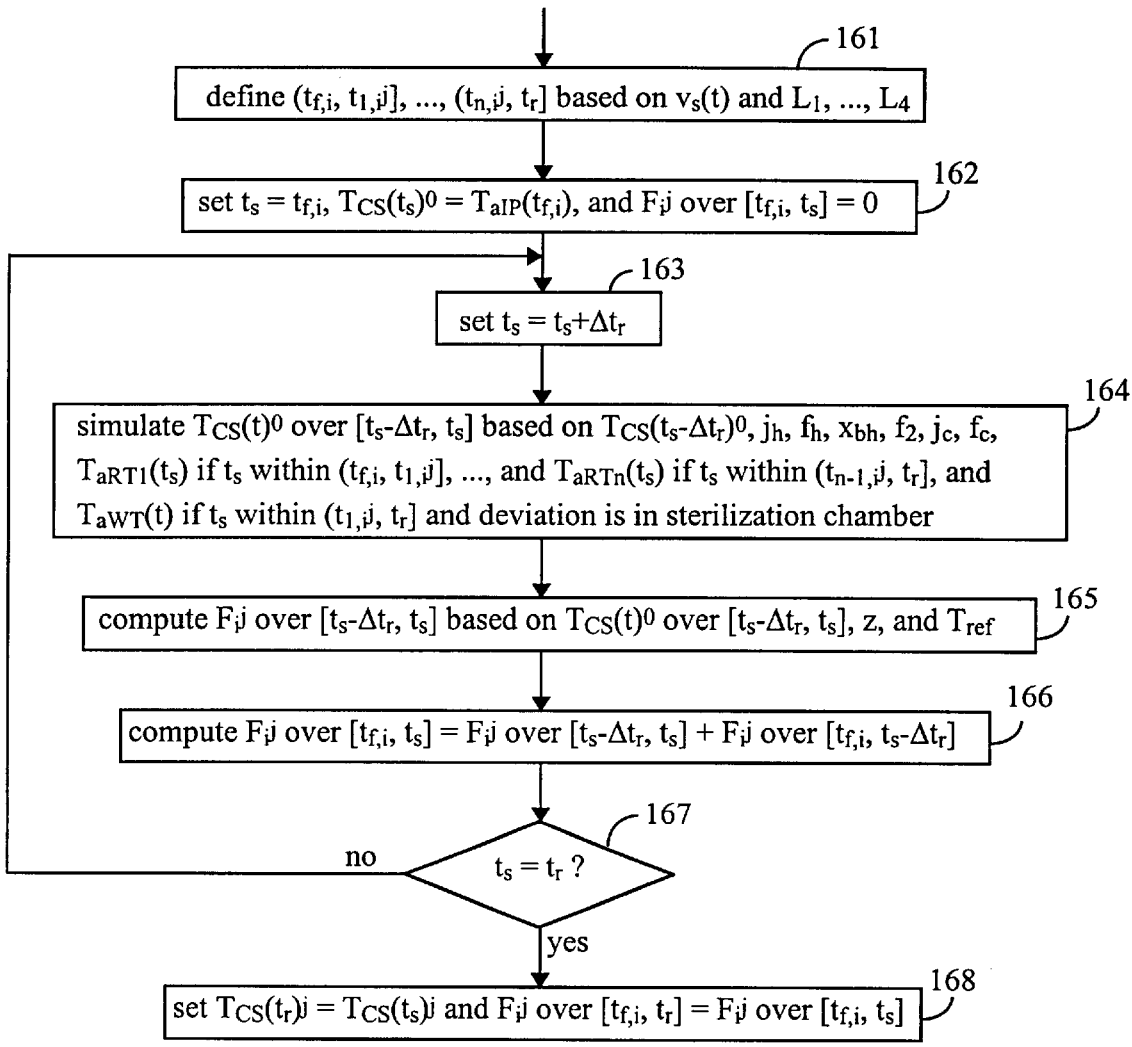

FIG. 7 shows the detailed process flow that the temperature deviation program 125 uses in steps 142 and 148 of FIG. 3 to compute the actual current lethality $F_i^j$ delivered to the product cold spots of the containers in the carrier i over the actual time interval $[t_{f,i}, t_r]$ that the carrier has been in the hydrostatic sterilizer 102. This is done by iteratively performing sub-steps 161 to 168 of steps 142 and 148 to simulate the actual portion of the hydrostatic sterilization process that has been administered to the product cold spots over this time interval. Here, steps 161 to 168 are respectively similar to steps 151 to 158 of FIG. 6 and discussed in section 1.c., except for the differences discussed next.

In step 161, the temperature deviation program 125 defines the actual time intervals $[t_{f,i}, t_{1,i}^j], \ldots, (t_{n-1,i}^j, t_r]$ that the carrier i has actually been in the respective chambers 115-1, ..., n up to the current sample real time $t_r$. In this step, the definition of these time intervals is based on the accumulated conveyor time-speed profile $v_a(t)$. In addition, if the temperature deviation is occurring in the sterilization chamber 115-2 and the sterilization chamber is of the type in which its water level is not controlled, the program also defines the portion(s) of the time interval $(t_{n-1,i}^j, t_r]$ that the carrier was immersed in the water. The definition of these time intervals is based on the accumulated conveyor time-speed profile $v_s(t)$, the length and location information $L_1$ and $L_2$ for the legs 111-1 and 2, and the water level-time profile $WL_a(t)$.

In step 162, the temperature deviation program 125 initially sets the product cold spot temperature $T_{CS}(t_s)_i^j$ for the product cold spots of the containers in the carrier i at the initial sample simulation time $t_s$ to the actual initial product temperature $T_{aIP}(t_{f,i})$. This temperature is obtained from the actual initial product time-temperature profile $T_{aIP}(t)$. Moreover, the program initially sets the actual lethality $F_i^j$ delivered to the product cold spots over the current simulation time interval $[t_{f,i}, t_s]$ to zero.

In step 164 of each iteration, the process scheduling program 124 simulates the portion of the product cold spot time-temperature profile $T_{CS}(t)_i^j$ that actually occurred at the product cold spots of the containers in the carrier i over the current simulation time increment $[t_s-\Delta t_r, t_s]$. With one exception, this simulation is based on the respective actual retort temperatures $T_{aRT1}(t_s), \ldots, T_{aRTn}(t_s)$ when the current simulation time $t_s$ is within the corresponding simulation time intervals $[t_{f,i}, t_{1,i}^j], \ldots, (t_{n-1,i}^j, t_r]$. These actual retort temperatures are obtained from the corresponding actual retort time-temperature profiles $T_{aRT1}(t), \ldots, T_{aRTn}(t)$. The exception is in the case where the temperature deviation is occurring in the sterilization chamber 115-2 and the sterilization chamber is of the type in which its water level is not controlled. In this case, the portions of the actual water time-temperature profile $T_{aWT}(t)$ over the portion(s) of the time interval $(t_{n-1,i}^j, t_r]$ that the carrier was immersed in the water are used instead of the corresponding portion(s) of the actual retort time-temperature profile $T_{aRT2}(t)$.

The actual lethality $F_i^j$ that was delivered to the product cold spots of the containers carried by the carrier i over the current simulation time increment $[t_s-\Delta t_r, t_s]$ is then computed by the temperature deviation program 125 in step 165 of each iteration. This is done based on the actual portion of the product cold spot time-temperature profile $T_{CS}(t)_i^j$ that was simulated over this time increment. In this case, $T_{CS}(t)=T_{CS}(t)_i^j$ and $F_i=F_i^j$ in the lethality equation described earlier.

In step 166 of each iteration, the temperature deviation program 125 computes the actual lethality $F_i^j$ delivered to the cold spots of the containers in the carrier i over the current simulation time interval $[t_{f,i}, t_s]$. This is done by adding the actual lethality $F_i^j$ over the current simulation time increment $[t_s-\Delta t_r, t_s]$ in step 164 to the actual lethality $F_i^j$ over the previous simulation time interval $[t_{f,i}, t_s-\Delta t_r]$.

Then, in step 167 of each iteration, the temperature deviation program 125 determines whether the current simulation time $t_s$ has reached the current sample real time $t_r$. If it is not, then the program returns to step 163 for the next iteration. In this way, steps 163 to 167 are repeated in each subsequent iteration until it is determined that the current sample real time has been reached. When this finally occurs, the temperature deviation program 125 sets in step 168 the lethality $F_i^j$ over the current simulation time interval $[t_{f,i}, t_s]$ to the actual current lethality $F_i^j$ over the actual time interval $[t_{f,i}, t_r]$ and the product cold spot temperature $T_{CS}(t_s)_i^j$ for the carrier at the current sample simulation time to the actual product cold spot temperature $T_{CS}(t_r)_i^j$ at the current sample real time.

1.e. Detailed Process Flow for Computing Lethality $F_i^j$ over $[t_{f,i}, t_{d,i}^j]$ in Steps 142 and 148 of FIG. 3

Figure 8:
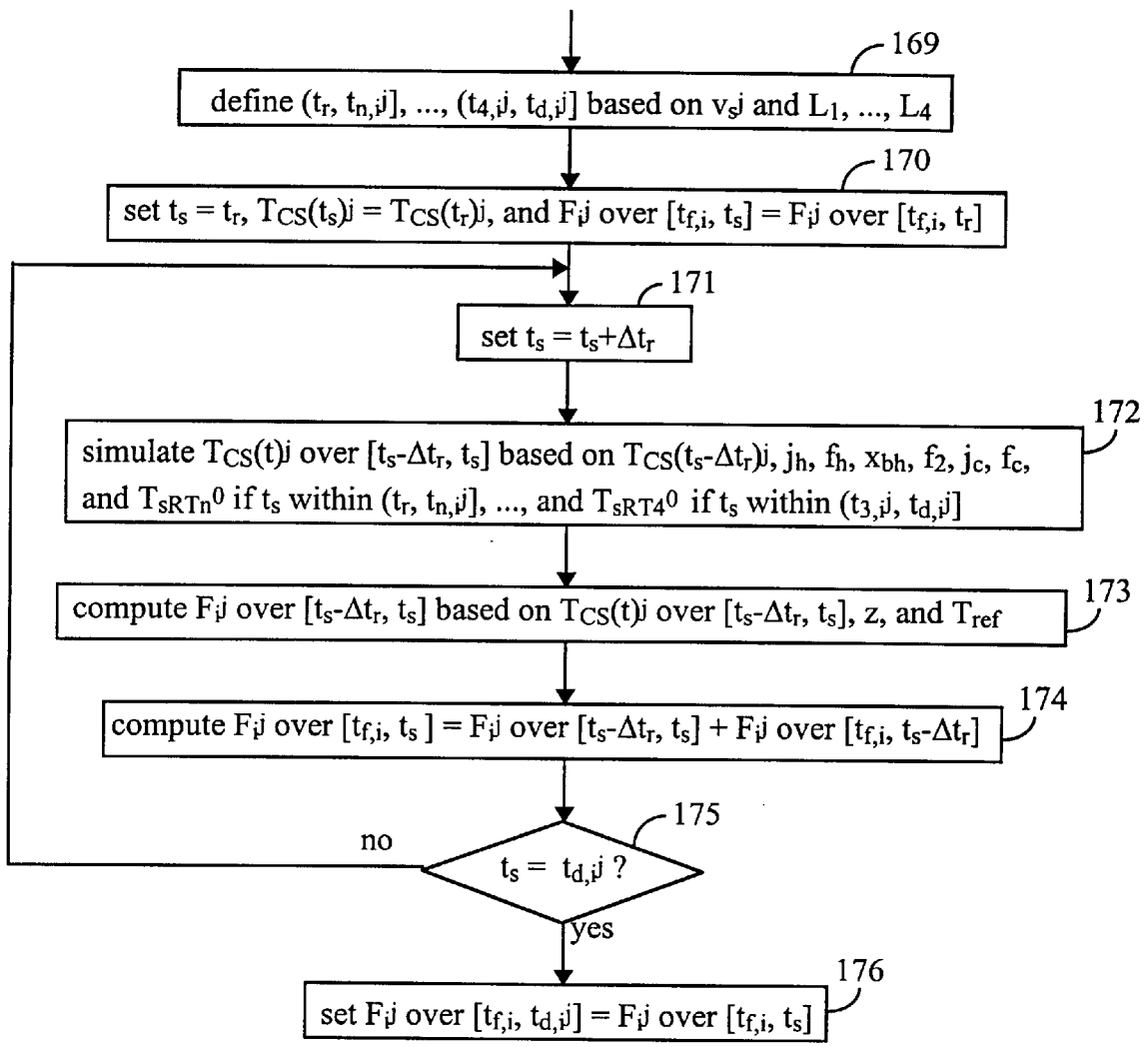

FIG. 8 shows the detailed process flow that the temperature deviation program 125 uses in steps 142 and 148 of FIG. 3 to compute the lethality $F_i^j$ predicted to be delivered to the product cold spots of the containers in a selected carrier over the total time interval $[t_{f,i}, t_{d,i}^j]$ that the carrier is in the hydrostatic sterilizer 102. In this case, the program iteratively performs a simulation of the predicted remaining portion of the hydrostatic sterilization process to be administered to this carrier using sub-steps 169 to 176 of steps 142 and 148. Like steps 161 to 168, steps 169 to 176 are respectively similar to steps 151 to 158 of FIG. 6 and discussed in section 1.c., except for the differences discussed next.

In step 169, the temperature deviation program 125 defines the remaining time intervals $(t_r, t_{n,i}^j), \ldots, (t_{3,i}^j, t_{d,i}^j)$ that the carrier i is predicted to be in the respective chambers 115-n, . . . , 4 after the current sample real time $t_r$. The definition of these time intervals in step 169 is based on the currently scheduled conveyor speed $v_s^j$.

In step 170, the temperature deviation program 125 initially sets the initial sample simulation time $t_s$ to the current sample real time $t_r$. The program also initially sets the predicted product cold spot temperature $T_{CS}(t_s)_i^j$ for the product cold spots of the containers carried by the carrier i at this sample simulation time to the actual product cold spot temperature $T_{CS}(t_r)_i^j$ obtained from step 168 of FIG. 7. Moreover, the program initially sets the predicted lethality $F_i^j$ to be delivered to the product cold spots over the current simulation time interval $[t_{f,i}, t_s]$ to the actual lethality $F_i^j$ over the actual time interval $[t_{f,i}, t_r]$ also obtained from step 168.

In step 172 of each iteration, the temperature deviation program 125 simulates the portion of the product cold spot time-temperature profile $T_{CS}(t)_i^j$ that is predicted to occur at the product cold spots of the containers in the carrier i over the current simulation time increment $[t_s-\Delta t_r, t_s]$. The simulation is based on the respective scheduled retort temperatures $T_{sRTn}^0, \ldots, T_{sRT4}^0$ when the current simulation time $t_s$ is within the corresponding simulation time intervals $(t_r, t_{n,i}^j), \ldots, (t_{3,i}^j, t_{d,i}^j)$.

The lethality $F_i^j$ that is predicted to be delivered over the current simulation time increment $[t_s-\Delta t_r, t_s]$ is then computed by the temperature deviation program 125 in step 173 of each iteration. This is done based on the predicted portion of the product cold spot time-temperature profile $T_{CS}(t)_i^j$ that was simulated over this time increment in step 172.

In step 174 of each iteration, the temperature deviation program 125 computes the lethality $F_i^j$ predicted to be delivered to the product cold spots of the containers in the carrier i over the current simulation time interval $[t_{f,i}, t_s]$. This is done by adding the predicted lethality $F_i^j$ over the current simulation time increment $[t_s-\Delta t_r, t_s]$ from step 173 to the predicted lethality $F_i^j$ over the previous simulation time interval $[t_{f,i}, t_s-\Delta t_r]$.

Then, in step 175 of each iteration, the temperature deviation program 125 determines whether the current sample simulation time $t_s$ has reached the predicted unloading time $t_{d,i}^j$ for the carrier i. If it has not, then the program returns to step 171 for the next iteration. In this way, steps 171 to 175 are repeated in each subsequent iteration until it is determined that the predicted unloading time has been reached. When this finally occurs, the program sets in step 176 the lethality $F_i^j$ over the current simulation time interval $[t_{f,i}, t_s]$ to the predicted lethality $F_i^j$ over the currently scheduled total time interval $[t_{f,i}, t_{d,i}^j]$.

1.f. Detailed Process Flow for Step 146 of FIG. 3

Figure 9:
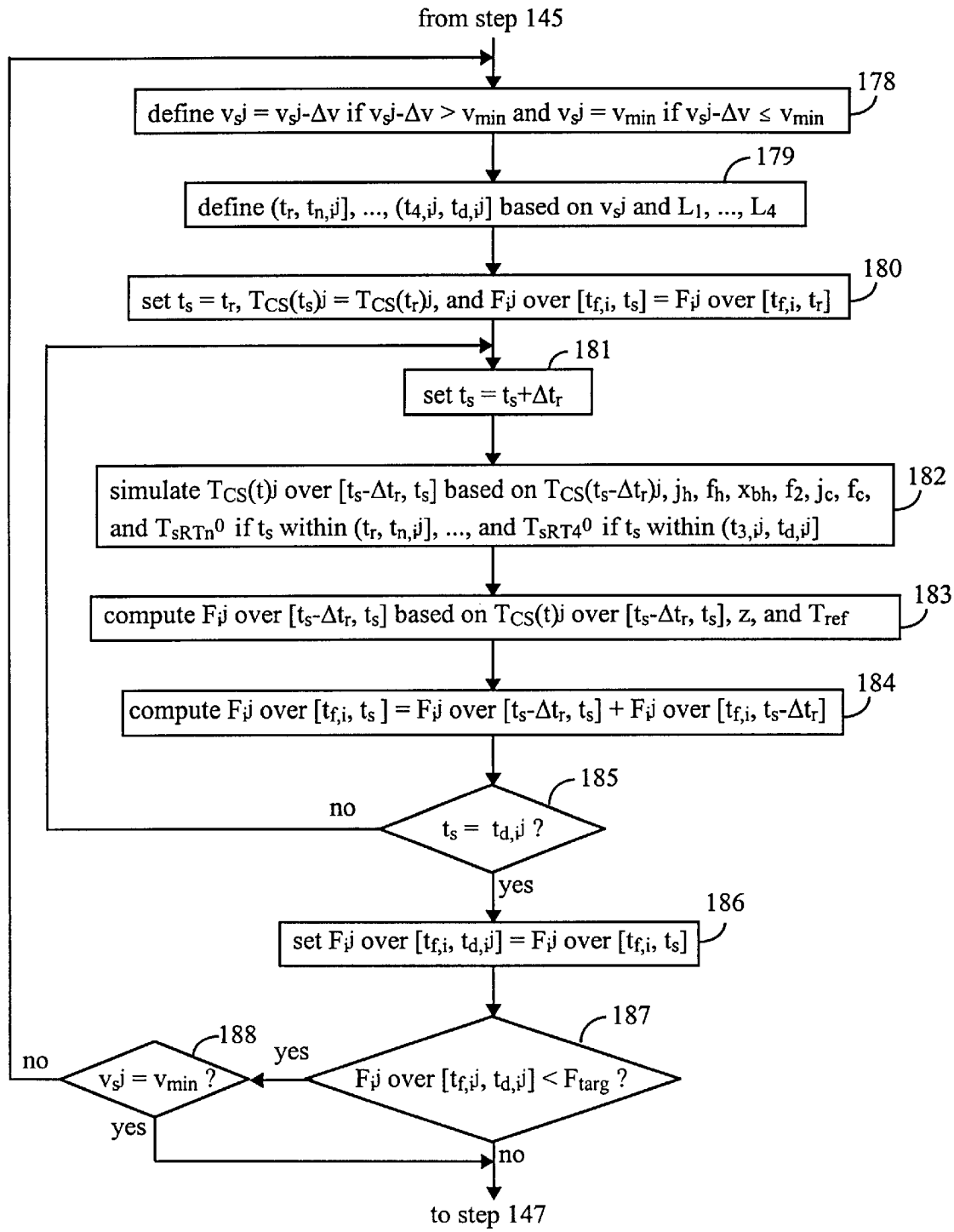

FIG. 9 shows the detailed process flow that the temperature deviation program 125 uses in step 146 of FIG. 3 to define the re-scheduled conveyor speed $v_s^j$. This program uses sub-steps 178 to 187 to iteratively perform a simulation of the remaining portion of the hydrostatic sterilization process predicted to be administered to the minimum lethality carrier i identified in step 142 of FIG. 3 and discussed in section 1.b. Steps 178 to 187 are respectively similar to steps 159 and 151 to 159 of FIG. 6 and discussed in section 1.c., except for the differences discussed next.

In step 178, the temperature deviation program 125 first decrements the currently scheduled conveyor speed $v_s^j$ by the predefined conveyor speed offset $\Delta v$. If the decremented conveyor speed is greater than the minimum conveyor speed $v_{min}$, the re-scheduled conveyor speed is defined as the decremented conveyor speed. However, if the decremented conveyor speed is less than or equal to the minimum conveyor speed, then the re-scheduled conveyor speed is defined as the minumum conveyor speed.

Since a re-scheduled conveyor speed $v_s^j$ is defined in step 178, the re-scheduled remaining time intervals $(t_r, t_{n,i}^j), \ldots, (t_{3,i}^j, t_{d,i}^j)$ that the minimum lethality container i is predicted to be in the respective chambers 115-n, . . . , 4 after the current sample real time $t_r$ need to be defined. This is done in step 179.

Step 180 to 186 are the same as steps 170 to 176 of FIG. 8 and discussed in section i.e. Thus, these steps are used to compute a total lethality $F_i^j$ predicted to be delivered to the product cold spots of the containers in the minimum lethality carrier i over the re-scheduled total time interval $[t_{f,i}, t_{d,i}^j]$. It should be noted here that this is done using the actual current lethality $F_i^j$ over $[t_{f,i}, t_r]$ and the actual cold spot temperature $T_{CS}(t_r)^j$ for the minimum lethality carrier i computed in steps 161 to 168 of FIG. 7.

Then, in step 187, the temperature deviation program 125 determines if the predicted total lethality $F_i^j$ over $[t_{f,i}, t_{d,i}^j]$ satisfies the target total lethality $F_{targ}$. If it does not, then the program determines in step 188 whether the re-scheduled conveyor speed $v_s^j$ equals the minimum conveyor speed $v_{min}$. If it does not, then steps 181 to 188 are repeated until it is determined in step 187 that the target lethality has been satisfied or it is determined in step 188 that the minimum conveyor speed has been reached. In this way, the conveyor speed is re-scheduled.

2. Alternative Embodiments

As indicated earlier, the embodiment of controller 104 associated with FIGS. 3 to 9 and described in section 1. is an exemplary embodiment. Alternative embodiments that utilize the principles and concepts developed in FIGS. 3 to 9 and section 1. do exist. Some of these embodiments are discussed next.

2.a. Scheduling and Re-Scheduling Variations

The operator of the hydrostatic sterilization process 100 may want to keep the initially scheduled conveyor speed $v_s^0$ and retort temperatures $T_{sRT1}^0, \ldots, T_{sRT4}^0$ constant throughout the entire hydrostatic sterilization process. Thus, in this embodiment, the temperature deviation program 125 is simply used to identify the under processed carriers $\{\ldots, i, \ldots\}_{underpr}$ in the manner discussed earlier in section 1.b. when a temperature deviation occurs. More specifically, the steps 145 to 147 would be eliminated from the flow diagram of FIG. 3.

In another embodiment, the initially scheduled retort temperatures $T_{sRT1}^0, \ldots, T_{sRT4}^0$ may be re-scheduled when a temperature deviation occurs. In this case, the temperature deviation program 125 would define a re-scheduled retort temperature $T_{sRT1}^j, \ldots,$ or $T_{sRT4}^j$ in a similar manner to which it defined a re-scheduled conveyor speed $v_s^j$ in step 146 of FIG. 3 and steps 178 to 188 of FIG. 9. In this embodiment, the initially scheduled conveyor speed $v_s^0$ may be kept constant or a re-scheduled conveyor speed $v_s^j$ may be defined in conjunction with the re-scheduled retort temperature.

2.b. Identifying and Segregating Over Processed Carriers

Since re-scheduled conveyor speed $v_s^j$ may be defined when a temperature deviation occurs, it is possible that some of the carriers $\{1, \ldots, i, \ldots, I\}$ may be over processed due to the slower re-scheduled conveyor speed. In this case, a maximum total lethality $F_{max}$ may be pre-defined and included as one of the input parameters. Then, the over processed carriers $\{\ldots, i, \ldots\}_{overpr}$ with predicted total lethalities $\{\ldots, F_i^j$ over $[t_{f,i}, t_{d,i}^j], \ldots\}_{overpr}$ over this maximum total lethality would be identified in a similar manner to that way in which the under processed carriers $\{\ldots, i, \ldots\}_{underpr}$ are identified in step 148 of FIG. 3 and discussed in section 1.b. The containers in these carriers would be segregated in the same way that the conatiners of under processed carriers are segregated in step 141 of FIG. 3. As a result, the conatiners in the remaining carriers that are not under or over processed would have a uniform quality food product using this technique.

2.c. More Conservative Approaches

In steps 142 and 148 of FIG. 3 discussed in section 1.b. and in steps 161 to 168 of FIG. 7 discussed in section 1.d., an aggressive approach was discussed for simulating the actual portion of the product cold spot time-temperature profile $T_{CS}(t)_i^j$ that occurs over the actual time interval $[t_{f,i}, t_r]$ that a carrier i has been in the hydrostatic sterilizer 102. Specifically, this portion of the product cold spot time-temperature profile is based on the actual retort time-temperature profiles $T_{aRT1}(t), \ldots, T_{aRTn}(t)$ over the corresponding time intervals $[t_{f,i}, t_{1,i}^j], \ldots, (t_{n-1,i}^j, t_r]$ and, if required, the actual water time-temperature profile $T_{aWT}(t)$ over the portion(s) of the time interval $(t_{1,i}^j, t_r]$ that the carrier is immersed in the water of the sterilization chamber 115-2.

However, a more conservative embodiment could be employed which uses only the the actual retort time-temperature profile $T_{aRTn}(t)$ for the chamber 115-n in which the temperature deviation occurs. For example, only the portion of this actual retort time-temperature profile over the time interval from the time when the carrier is first affected by the temperature deviation to the current sample real time $t_r$ would be used. However, there is an exception in the case where the temperature deviation is occurring in the sterilization chamber 115-2 and the sterilization chamber is of the type in which its water level is not controlled. In this case, the actual water time-temperature profile $T_{aWT}(t)$ over the portion(s) of this time interval $(t_{1,i}^j, t_r]$ that the carrier is immersed in the water of the sterilization chamber 115-2 would be used instead of the corresponding portion(s) of the actual retort time-temperature profile $T_{aRT2}(t)$. Then, the portion of the product cold spot time-temperature profile $T_{CS}(t)_i^j$ over the time intervals $[t_{f,i}, t_{1,i}^j], \ldots, (t_{n-2,i}^j, t_{n-1,i}^j]$ would be based on the corresponding scheduled retort temperatures $T_{sRT1}^0, \ldots, T_{sRTn-1}^0$ for the chambers 115-1, $\ldots$, n-1 in which the temperature deviation is not occurring.

Thus, if the carrier enters the chamber 115-n while the temperature deviation is occurring, the portion of the product cold spot time-temperature profile $T_{CS}(t)_i^j$ over the time interval $(t_{n-1,i}^j, t_r]$ would still be based on the corresponding portion(s) of the actual retort time-temperature profile $T_{aRTn}(t)$ and, if required, actual water time-temperature profile $T_{aWT}(t)$ over this time interval. But, if the temperature deviation begins at the deviation begin time $t_d$ while the carrier is in this chamber, then the portion of the product cold spot time-temperature profile over the time interval $(t_{n-1,i}^j, t_{dev}]$ would be based on the scheduled temperature $T_{sRTn}^0$. In this case, only the portion of the product cold spot time-temperature profile over the time interval $(t_{dev}, t_r]$ would be based on the corresponding portion(s) of the actual retort and water time-temperature profiles over this time interval. In either case, this results in the actual lethality $F_i^j$ delivered over the time interval $[t_{f,i}, t_r]$ being computed more conservatively in steps 142 and 148 of FIG. 3 and in sub-steps 161 to 168 of FIG. 7.

Similarly, the actual initial product temperature $T_{aIP}(t_{f,i})$ for a carrier i was used in steps 142 and 148 of FIG. 3 and in sub-steps 161 to 168 of FIG. 7 of FIG. 7 for computing the actual lethality $F_i^j$ over $[t_{f,i}, t_r]$. However, rather than using this actual initial product temperature, the scheduled initial product temperature $T_{sIP}$ may be used. This also results in the actual lethality being more conservative.

2.d. More Aggressive Approaches

A more aggressive approach than that described earlier in section 1.c. can be taken for defining the initially scheduled conveyor speed $v_s^0$. In this approach, a first additional step could be added after step 159 of FIG. 6 to determine whether the predicted total lethality $F_i^0$ over $[0, \Delta t_1^0 + \ldots + \Delta t_4^0]$ is within the target total lethality $F_{targ}$ by a predefined lethality tolerance $\Delta F$. If this is the case, the conveyor speed obtained in step 160 in the last iteration is used as the initially scheduled conveyor speed. However, if this is not the case, then the conveyor speed from the last iteration is overly conservative. As a result, a second additional step may be added to increase this conveyor speed by, for example, 0.5Δv. Steps 151 to 159 and the two additional steps are then repeated until the first additional step is satisfied. In this way, the initially scheduled conveyor speed is further refined in an aggressive manner.

Similarly, a more aggressive approach can also be taken for defining the re-scheduled conveyor speed $v_s^j$. In this case, the steps 178 to 188 of FIG. 9 discussed in section 1.f. would also include the two additional steps just described.

2.e. Deviations in Scheduled Initial Product Temperature, Water Level, and/or Conveyor Speed In addition to temperature deviations in the scheduled retort temperatures $T_{sRT1}^0, \ldots, T_{sRT4}^0$, there may be deviations in other scheduled parameters of the hydrostatic sterilization process. For example, there may be deviations in the scheduled initial product temperature $T_{sIP}$, the scheduled water level $WL_s$, and/or the currently scheduled conveyor speed $v_s^j$. These deviations would be detected by monitoring the actual initial product time-temparature profile $T_{aIP}(t)$, the actual water level-time profile $WL_a(t)$, and the actual conveyor time-speed profile $v_a(t)^j$. Thus, the controller 104 may be configured to handle these deviations as well in order to identify any under and/or over processed carriers $\{\ldots, i, \ldots\}_{underpr}$ and/or $\{\ldots, i, \ldots\}_{overpr}$ resulting from the deviation and then segregate their containers. This is done in a similar manner to that described earlier in sections 1.b. to 1.e. for temperature deviations in the scheduled retort temperatures.

2.f. Different Combinations of Chambers

The hydrostatic sterilizer 102 of FIG. 1 was described as having a feed chamber 115-1, a sterilization chamber 115-2, a discharge chamber 115-3, and a cooling chamber 115-4. Correspondingly, the flow and timing diagrams of FIGS. 3 to 9 were described in this context as well. However, those skilled in the art will recognize that the hydrostatic sterilizer may have less or more chambers. For example, the hydrostatic sterilizer may have a pressure pre-cooking chamber and/or a pressure pre-cooling chamber. As those skilled in the art will recognize, the flow and timing diagrams of FIGS. 3 to 9 would have to be correspondingly adjusted for the specific combination of chambers used.

2.g. Other Continuous Source Sterilization Systems

The present invention has been decribed in the context of a hydrostatic sterilization system 100. However, as those skilled in the art will recognize, the invention can be similarly practiced in any other continuous source sterilization system in which containers or carriers of containers are conveyed in line through the systems sterilizer. For example, the invention may be used in a rotary sterilizer, as described in concurrently filed and co-pending U.S. patent application Ser. No. 09/188,531, entitled Controller and Method for Administering and Providing On-Line Handling of Deviations in a Rotary Sterilization Process, filed on Nov. 6, 1998, with Weng, Z. as named inventor. This patent application is hereby explicitly incorporated by reference.

3. Conclusion

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of administering a sterilization process being performed by a hydrostatic sterilizer on a continues line of carriers of containers that contain a food product, the method comprising the steps of:

controlling the hydrostatic sterilizer to perform the hydrostatic sterilization process according to scheduled parameters;

determining when a deviation in a specific one of the scheduled parameters occurs; and when a deviation occurs, identifying those of the carriers that will in response have a total lethality predicted to be delivered to them during the sterilization process that is less than a predefined target lethality.

2. The method of claim 1 wherein the identifying step comprises the step of, at each sample real time during the deviation, identifying those of the carriers that will have total lethality predicted to be delivered to them over the sterilization process that is less than the predefined target lethality.

3. The method of claim 2 further comprising the step of:

compiling an actual retort time temperature profile for a chamber of the hydrostatic sterilizer in which the deviation occurs; and wherein the identifying step at each sample real time during the deviation comprises the steps of:

selecting at least some of the carriers that are currently affected by the deviation at the real sample time for evaluation;

for each of the selected carriers, simulating a product cold spot time-temperature profile for the carrier based on at least the portion of the actual retort temperature profile compiled over a time interval from a time when the carrier was first affected by the deviation to the sample real time;

computing the total lethality predicted to be delivered to the carrier during the sterilization process based on the product cold spot time-temperature profile; and determining whether the total lethality predicted to be delivered to the carrier satisfies the target lethality.

4. The method of claim 2 further comprising the step of:

compiling an actual retort temperature profile for a chamber of the hydrostatic sterilizer in which the deviation occurs;

compiling an actual water time-temperature profile for water in the chamber; and wherein the identifying step at each sample real time during the deviation comprises the steps of:

selected at least some of the carriers that are currently affected by the deviation at the real sample time for evaluation;

for each of the selected carriers;

simulating a product cold spot time-temperature profile for the carrier based on (a) at least the portion of the actual retort temperature profile compiled over a time interval from a time when the carrier was first affected by the deviation to the sample real time except for any portion or portions over a time interval or time intervals that the carrier has been immersed in the water during the deviation, (b) any portion of portions of the actual water time-temperature profile over a time interval or time intervals that the carrier has been immersed in the water during the deviation;

computing the total lethality predicted to be delivered to the carrier during the sterilization process based on the product cold spot time-temperature profile; and determining whether the total lethality predicted to be delivered to the carrier satisfies the target lethality.

5. The method of claim 3 or 4 wherein the total lethality predicted to be delivered to the carrier is the sum of (1) a lethality actually delivered over an actual time interval from a feed time when the carrier is fed into the hydrostatic sterilizer to a sample real time, and (2) a lethality predicted to be delivered over a remaining time interval from the sample real time to a discharge time when the carrier is discharged from the hydrostatic sterilizer.

6. The method of claim 5 wherein:

the lethality actually delivered over the actual time interval is based on the portion of the cold spot time-temperature profile over the actual time interval;

the portion of the product cold spot time-temperature profile over the actual time interval is based on at least the portion of the actual retort temperature profile over the time interval from the time when the carrier is first affected by the deviation to the sample real time.

7. The method of claim 6 wherein:

the lethality predicted to be delivered over the remaining time interval is based on the portion of the cold spot time-temperature profile over the remaining time interval;

the scheduled parameters include one or more scheduled retort temperatures that are scheduled for the sterilization process in the second time interval; and the portion of the product cold spot time-temperature profile over the remaining time interval is based on the one or more scheduled retort temperatures.

8. A controller for administering a sterilization process performed by a hydrostatic sterilizer on a continues line of carriers of containers that contain a food product, the controller comprising:

control circuitry configured to control the hydrostatic sterilizer;

a memory configured to store a process control program and a deviation program, the process control program being programmed to cause the control circuitry to control the hydrostatic sterilizer in performing the sterilization process according to scheduled parameters, the deviation program being programmed to (a) determine when a deviaion in a specific one of the scheduled parameters occurs, and (b) identify, when the deviation occurs, those of the carriers that will in response have a total lethality predicted to be delivered to them during the sterilization process that is less than a predefined target lethality; and a microprocessor coupled to the memory and the control circuitry and configured to execute the process control and temperature deviation programs.

9. The controller of claim 8 wherein:

the lethality predicted to be delivered over the remaining time interval is based on the portion of the cold spot time-temperature profile over the remaining time interval;

the scheduled parameters include one or more scheduled retort temperatures that are scheduled for the sterilization process in the second time interval; and the portion of the product cold spot time-temperature profile over the remaining time interval is based on the one or more scheduled retort temperatures.

10. The controller of claim 9 wherein the specific one of the scheduled parameters is one of the group consisting of (1) a scheduled retort temperature in a chamber, (2) a scheduled water level in the chamber, (3) a scheduled initial product temperature for the line of carriers, and (4) a scheduled conveyor speed for conveying the line of carriers through the hydrostatic sterilizer.

11. The controller of claim 8 wherein the deviation programmed is further programmed to, at each sample real time during the deviation, identify those of the carriers that will have a total lethality predicted to be delivered to them over the sterilization process that is less then the predefined target lethality.

12. The controller of claim 11 wherein:

the process control program is further programmed to compile an actual retort time temperature profile for a chamber of the hydrostatic sterilizer in which the deviation occurs; and the deviation program is further programmed to identify the identified carriers at each sample real time during the deviation by:

selecting for evaluation at least some of the carriers that are currently effected by the deviation at the real sample time;

for each of the selected carriers, simulating a product cold spot time-temperature profile for the carrier based on at least the portion of the actual retort temperature profile compiled over a time interval from a time when the carrier was first affected by the deviation to the sample real time;

computing the total lethality predicted to be delivered to the carrier during the sterilization process based on the product cold spot time-temperature profile; and determining whether the total lethality predicted to be delivered to the delivered to the carrier satisfies the target lethality.

13. The controller of claim 9 wherein the deviation program is programmed to use a finite difference simulation model to simulate the product cold spot time-temperature profile.

14. The controller of claim 11 wherein:

the process control program is further programmed to compile (a) an actual retort time temperature profile for a chamber of the hydrostatic sterilizer in which the deviation occurs, and (b) an actual water time-temperature profile for water in the chamber; and the deviation program is further programmed to identify carriers at each sample real time during the deviation by:

selecting for evaluation at least some of the carriers that are currently effected by the deviation at the real sample time;

for each of the selected carriers;

simulating a product cold spot time-temperature profile for the carrier based on (a) at least the portion of the actual retort temperature profile compiled over a time interval from a time when the carrier was first affected by the deviation to the sample real time except for any portion or portions over a time interval or time intervals that the carrier has been immersed in the water during the deviation, (b) any portion or portions of the actual water time-temperature profiles over a time interval or intervals that the carrier has been immersed in the water during the deviation;

computing the total lethality predicted to be delivered to the carrier during the sterilization process based on the product cold spot time-temperature profile; and determining whether the total lethality predicted to be delivered to the carrier satisfies the target lethality.

15. The controller of claim 12 or 14 wherein the total lethality predicted to be delivered to the carrier is the sum of (1) a lethality actually delivered over an actual time interval from a feed time when the carrier is fed into the hydrostatic sterilizer to the sample real time, and (2) a lethality predicted to be delivered over a remaining time interval from the sample real time to a discharge time when the carrier is discharged from the hydrostatic sterilizer.

16. The controller of claim 15 wherein:
the lethality actually delivered over the actual time interval is based on the portion of the cold spot time-temperature profile over the actual time interval;
the portion of the product cold spot time-temperature profile over the actual time interval is based on at least a portion of the actual retort temperature profile over the time interval from the time when the carrier is first affected by the deviation to the sample real time.

17. A hydrostatic sterilization system comprising:
a hydrostatic sterilizer configured to perform a sterilization process on a continues line of carriers that contain a food product;
a controller configured to:
control the hydrostatic sterilizer in performing the hydrostatic sterilization process according to scheduled parameters;
determine when a deviation in a specific one of the scheduled parameters occurs; and
when a deviation occurs, identify those of the carriers that will in response have a total lethality predicted to be delivered to them during the sterilization process that is less than a predefined target lethality.

18. The hydrostatic sterilization system of claim 17 wherein:
the lethality predicted to be delivered over the remaining time interval is based on the portion of the cold spot time-temperature profile over the remaining time interval;
the scheduled parameters include one or more scheduled retort temperatures that are scheduled for the sterilization process in the remaining time interval; and
the portion of the product cold spot time-temperature profile over the remaining time interval is based on the one or more scheduled retort temperatures.

19. The hydrostatic sterilization system of claim 18 wherein the specific one of the scheduled parameters is one of the group consisting of (1) a scheduled retort temperature in the chamber, (2) a scheduled water level in the chamber, (3) a scheduled initial product temperature for the line of carriers, and (4) a scheduled conveyor speed for conveying the line of carriers through the hydrostatic sterilizer.

20. The hydrostatic sterilizer of claim 17 wherein the controller is further configured to, at each sample real time during the deviation, identify those of the carriers that will have a total lethality predicted to be delivered to them over the sterilization process that is less than the predefined target lethality.

21. The hydrostatic sterilization system of claim 20 further comprising:
a sensor to sense actual retort temperatures in a chamber of the hydrostatic sterilizer in which the deviation occurs;
wherein the controller is further configured to:
compile an actual retort time temperature profile from the sensed actual retort temperatures; and
identify the identified carriers at each sample real time during the deviation by:
selecting for evaluation at least some of the carriers that are effected by the deviation at the real sample time;
for each of the selected carriers,
simulating a product cold spot time-temperature profile for the carrier based on at least the portion of the actual retort temperature profile compiled over a time interval from a time when the carrier was first affected by the deviation to the sample real time;
computing the total lethality predicted to be delivered to the carrier during the sterilization process based on the product cold spot time-temperature profile; and
determining whether the total lethality predicted to be delivered to the carrier satisfies the target lethality.

22. The hydrostatic sterilization system of claim 21 wherein the controller is still further configured to use a finite difference simulation model to simulate the product cold spot time-temperature profile.

23. The hydrostatic sterilization of claim 20 further comprising:
a sensor to sense actual retort temperatures in a chamber of the hydrostatic sterilizer in which the deviation occurs;
wherein the controller is further configured to:
compile (a) an actual retort time temperature profile for a chamber of the hydrostatic sterilizer in which the deviation occurs, and (b) an actual water time-temperature profile for water in the chamber; and
identify the identified carriers at each sample real time during the deviation by:
selecting for evaluation at least some of the carriers that are currently effected by the deviation at the real sample time;
for each of the selected carriers,
simulating a product cold spot time-temperature profile for the carrier based on (a) at least the portion of the actual retort temperature profile compiled over a time interval from a time when the carrier was first affected by the deviation to the sample real time except for any portion or portions over a time interval or time intervals that the carrier has been immersed in the water during the deviation, (b) any portion or portions of the actual water time-temperature profile over a time interval or time intervals that the carrier has been immersed in the water during the deviation;
computing the total lethality predicted to be delivered to the carrier during the sterilization process based on the product cold spot time-temperature profile; and
determining whether the total lethality predicted to be delivered to the carrier satisfies the target lethality.

24. The hydrostatic sterilization system of claim 21 or 23 wherein the total lethality predicted to be delivered to the carrier is the sum of (1) a lethality actually delivered over an actual time interval from a feed time when the carrier is fed into the hydrostatic sterilizer to a current sample real time, and (2) a lethality predicted to be delivered over a remaining time interval from the sample real time to a discharge time when the carrier is discharged from the hydrostatic sterilizer.

25. The hydrostatic sterilization system of claim 24 wherein:

the lethality actually delivered over the first time interval is based on the portion of the cold spot time-temperature profile over the first time interval;

the portion of the product cold spot time-temperature profile over the actual time interval is based on at least the portion of the actual retort temperature profile over a time interval from a time when the carrier is first affected by the deviation to the sample real time.

26. The method of claim 3 or 4 wherein the selecting step comprises:

compiling a list of the carriers currently affected by the deviation at the real sample time; and according to an optimization search technique, iteratively bisecting the lost to select carriers for evaluation based on the total lethalities predicted to be delivered to the carriers previously selected for evaluation.

27. The method of claim 3 or 4 wherein the selecting step comprises:

compiling a list of the carriers currently affected by the deviation at the real sample time; and selecting all of the carriers in the list for evaluation.

28. The method of claim 4 wherein the selecting step comprises:

compiling a list of the carriers currently affected by the deviation at the real sample time;

initially selecting carriers to be evaluated from the list at predefined intervals in the list; and according to an optimization search technique, iteratively bisecting the list around the initially selected carriers with the lowest lethalities predicted to be delivered to them to select carriers to be evaluated based on the total lethalities predicted to be delivered to the carriers previously selected to be evaluated.

29. The controller of claim 12 or 14 wherein the deviation program is further programmed to selected the select carriers by:

compiling a list of the carriers currently affected by the deviation at the real sample time; and according to an optimization search technique, iteratively bisecting the list to select carriers for evaluation based on the total lethalities predicted to be delivered to the carriers previously selected for evaluation.

30. The controller of claim 12 or 14 wherein the deviation program is further programmed to select the selected carriers by:

compiling a list of the carriers currently affected by the deviation at the real sample time; and selecting all of the carriers in the list for evaluation.

31. The controller of claim 14 wherein the deviation program is further programmed to select the selected carriers by:

compiling a list of the carriers currently affected by the deviation of the real sample time;

initially selecting carriers to be evaluated from the list at predefined intervals in the list; and according to optimization search technique, iteratively bisecting the list around the initially selected carriers with the lowest total lethalities predicted to be delivered to them to select carriers to be evaluated based on the total lethalities predicted to be delivered to the carriers previously selected to be evaluated.

32. The hydrostatic sterilization of claim 21 or 23 wherein the controller is further configured to selected the selected carriers by:

compiling a list of the carriers currently affected by the deviation at the real sample time; and according to an optimization search technique, iteratively bisecting the list to select carriers for evaluation based on the total lethalities predicted to be delivered to the carriers previously selected for evaluation.

33. The hydrostatic sterilization of claim 21 or 23 wherein the controller is further configured to select the selected carriers by:

compiling a list of the carriers currently affected by the deviation at the real sample time; and selecting all of the carriers in the list for evaluation.

34. The hydrostatic sterilization of claim 23 wherein the controller is further configured to select the selected carriers by:

compiling a list of the carriers currently affected by the deviation at the real sample time;

initially selecting carriers to be evaluated from the list at predefined intervals in the list; and according to an optimization search technique, iteratively bisecting the list around the initially selected carriers with the lowest total lethalities predicted to be delivered to them to select carriers to be evaluated based on the total lethalities predicted to be delivered to the carriers previously selected to be evaluated.

35. The method of claim 7 wherein the specific one of the scheduled parameters is one of the group consisting of (1) a scheduled retort temperature in a chamber, (2) a scheduled water level in the chamber, (3) a scheduled initial product temperature for the line of carriers, and (4) a scheduled conveyor speed for conveying the line of carriers through the hydrostatic sterilizer.

36. The method of claim 7 wherein a finite difference simulation model is used in the simulating step to simulate the product cold spot time-temperature profile.

* * * * *